United States Patent
Campbell et al.

(10) Patent No.: US 9,635,339 B2
(45) Date of Patent: Apr. 25, 2017

(54) MEMORY-EFFICIENT CODED LIGHT ERROR CORRECTION

(71) Applicant: QUALCOMM Incorporated, San Diego, CA (US)

(72) Inventors: Shandon Campbell, San Diego, CA (US); Stephen Michael Verrall, Carlsbad, CA (US); Kalin Mitkov Atanassov, San Diego, CA (US); Ovidiu Cristian Miclea, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 14/827,088

(22) Filed: Aug. 14, 2015

(65) Prior Publication Data

US 2017/0048507 A1 Feb. 16, 2017

(51) Int. Cl.
*H03M 13/00* (2006.01)
*H04N 13/00* (2006.01)

(52) U.S. Cl.
CPC ..... *H04N 13/0022* (2013.01); *H04N 13/0048* (2013.01); *H04N 2013/0081* (2013.01)

(58) Field of Classification Search
None
See application file for complete search history.

(56) References Cited

U.S. PATENT DOCUMENTS 4,653,104 A 3/1987 Tamura
6,229,913 B1 5/2001 Nayar et al.

(Continued)

FOREIGN PATENT DOCUMENTS

CN 102831582 A 12/2012
CN 103796004 A 5/2014

(Continued)

OTHER PUBLICATIONS

Buyukyazi T., et al., "Real-time Image Stabilization and Mosaicking by Using Ground Station CPU in UAV surveillance", 2013 6th International Conference on Recent Advances in Space Technologies (RAST), IEEE, Jun. 12, 2013 (Jun. 12, 2013), pp. 121-126, XP032477136, DOI : 10. 1109/RAST .2013.6581183 ISBN : 978-1-4673-6395-2.

(Continued)

*Primary Examiner* — M. Mujtaba Chaudry
(74) *Attorney, Agent, or Firm* — Knobbe, Martens, Olson & Bear, LLP

(57) ABSTRACT

Systems and methods for correcting errors in a depth map generated by a structured light system are disclosed. In one aspect, a method includes receiving valid and invalid codewords, the valid spatial codewords included in a codebook. The method includes detecting the invalid codeword. The method includes retrieving a set of candidate valid codewords a lowest Hamming distance between the invalid codeword and the valid codewords in the codebook. The method includes estimating a median depth of neighboring locations of the invalid codeword. The method includes associating a depth with each candidate codeword and selecting the candidate with an associated depth closest to the depth estimate. The method includes assigning the depth associated with the selected candidate codeword to the location of the invalid codeword.

30 Claims, 17 Drawing Sheets

(56) References Cited

U.S. PATENT DOCUMENTS

| | | |
|---|---|---|
| 7,212,663 B2 | 5/2007 | Tomasi |
| 7,894,525 B2 | 2/2011 | Piehl et al. |
| 7,916,932 B2 | 3/2011 | Lee et al. |
| 8,531,535 B2 | 9/2013 | Kwatra et al. |
| 8,724,854 B2 | 5/2014 | Jin et al. |
| 8,806,305 B2 | 8/2014 | Przybylski |
| 2004/0151365 A1 | 8/2004 | An Chang et al. |
| 2005/0018209 A1 | 1/2005 | Lemelin et al. |
| 2005/0229069 A1* | 10/2005 | Hassner ............... G11B 20/18 714/746 |
| 2008/0130016 A1 | 6/2008 | Steinbichler et al. |
| 2009/0310822 A1 | 12/2009 | Chang et al. |
| 2009/0322859 A1 | 12/2009 | Shelton et al. |
| 2010/0180176 A1* | 7/2010 | Yosoku ............. H03M 13/1188 714/752 |
| 2011/0096832 A1 | 4/2011 | Zhang et al. |
| 2012/0056874 A1 | 3/2012 | Kim et al. |
| 2012/0056982 A1 | 3/2012 | Katz et al. |
| 2012/0086803 A1 | 4/2012 | Malzbender et al. |
| 2012/0229609 A1 | 9/2012 | Yamada et al. |
| 2013/0038694 A1 | 2/2013 | Nichani et al. |
| 2013/0050426 A1 | 2/2013 | Sarmast et al. |
| 2013/0128121 A1 | 5/2013 | Agarwala et al. |
| 2013/0141544 A1 | 6/2013 | Tsuyuki |
| 2013/0162629 A1 | 6/2013 | Huang et al. |
| 2013/0293684 A1 | 11/2013 | Becker et al. |
| 2013/0314696 A1 | 11/2013 | Atanassov et al. |
| 2013/0315354 A1 | 11/2013 | Atanassov et al. |
| 2013/0315501 A1 | 11/2013 | Atanassov et al. |
| 2013/0342671 A1 | 12/2013 | Hummel et al. |
| 2014/0132721 A1 | 5/2014 | Martinez Bauza et al. |
| 2014/0160309 A1 | 6/2014 | Karpenko |
| 2014/0168362 A1* | 6/2014 | Hannuksela ....... H04N 13/0048 348/43 |
| 2014/0192154 A1* | 7/2014 | Jeong ................... H04N 19/597 348/43 |
| 2014/0223256 A1 | 8/2014 | Sakai et al. |
| 2014/0240318 A1 | 8/2014 | Coombe et al. |
| 2014/0241614 A1 | 8/2014 | Lee |
| 2014/0380115 A1 | 12/2014 | Bar-On |
| 2015/0117514 A1* | 4/2015 | Choi .................... H04N 19/597 375/240.01 |
| 2015/0178592 A1 | 6/2015 | Ratcliff et al. |
| 2015/0193938 A1* | 7/2015 | Freedman ............. G06T 7/0061 382/154 |
| 2015/0229911 A1 | 8/2015 | Ge et al. |
| 2016/0050372 A1 | 2/2016 | Lindner |
| 2016/0255332 A1 | 9/2016 | Nash et al. |
| 2016/0267671 A1 | 9/2016 | Atanassov et al. |
| 2016/0275690 A1 | 9/2016 | Siddiqui et al. |

FOREIGN PATENT DOCUMENTS

| | | |
|---|---|---|
| JP | 2012141252 A | 7/2012 |
| KR | 20140088309 A | 7/2014 |
| WO | WO-9210830 A1 | 6/1992 |
| WO | WO-0181859 A1 | 11/2001 |
| WO | WO-2013068548 A2 | 5/2013 |
| WO | WO-2013074510 A1 | 5/2013 |
| WO | WO-2015152829 A1 | 10/2015 |
| WO | WO-2016137753 | 9/2016 |

OTHER PUBLICATIONS

Hong W., et al., "Video Stabilization and Rolling Shutter Distortion Reduction", 2010 17th IEEE International Conference on Image Processing (ICIP 2010), Sep. 26-29, 2010, Hong Kong, China, IEEE, Piscataway, NJ, USA, Sep. 26, 2010 (Sep. 26, 2010), pp. 3501-3504, XP031811299, ISBN: 978-1-4244-7992-4.

Lindner A., et al., "Depth Enhanced and Content Aware Video Stabilization", Proceedings of SPIE, vol. 9411, Mar. 11, 2015 (Mar. 11, 2015), pp. 941106-1 to 941106-6, XP055229514, US ISSN: 0277-786X, DOI: 10.1117/12.2083443 ISBN: 978-1-62841-839-2.

Yahyanejad S., et al., "Incremental, Orthorectified and Loop-independent Mosaicking of Aerial Images taken by Micro UAVs", Robotic and Sensors Environments (ROSE), 2011 IEEE International Symposium on, IEEE, Sep. 17, 2011 (Sep. 17, 2011), pp. 137-142, XP031961274, DOI: 10.1109/ROSE.2011.6058531 ISBN: 978-1-4577-0819-0.

International Search Report and Written Opinion—PCT/US2016/043141—ISA/EPO—Nov. 4, 2016.

Tsalakanidou et al., "Real-time Acquisition of Depth and Color Images using Structured Light and its Application to 3D Face Recognition," Real-Time Imaging, Academic Press Limited, GB, vol. 11, No. 5-6, Oct. 1, 2005 (Oct. 1, 2005), pp. 358-369, XP005074682, ISSN: 1077-2014, DOI: 10.1016/J.RTI.2005.06.006.

Wijenayake U., et al., "An Error Correcting 3D Scanning Technique Using Dual Pseudorandom Arrays," 3D Imaging, Modeling, Processing, Visualization and Transmission (3DIMPVT), 2012 Second International Conference on, IEEE, Oct. 13, 2012 (Oct. 13, 2012), pp. 517-523, XP032277316, DOI: 10.1109/3DIMPVT.2012.68 ISBN: 978-1-4673-4470-8.

Wijenayake U., et al.,"Dual Pseudorandom Array Technique for Error Correction and Hole Filling of Color Structured-light three-dimensional Scanning," Optical Engineering., vol. 54(4), Apr. 27, 2015 (Apr. 27, 2015) , p. 043109 (18 pages), XP055309719.

Zhang J., et al., "Robust Human Tracking Algorithm Applied for Occlusion Handling", Frontier of Computer Science and Technology (FCST), 2010 Fifth International Conference on, IEEE, Piscataway, NJ, USA, Aug. 18, 2010 (Aug. 18, 2010), pp. 546-551, XP031755281, ISBN: 978-1-4244-7779-1.

* cited by examiner

MEMORY-EFFICIENT CODED LIGHT ERROR CORRECTION

FIELD

Various features relate to active depth sensing, and more specifically to efficient memory usage techniques for correcting gaps in depth maps resulting from data errors when interpreting depth information derived from structured light.

BACKGROUND

Imaging devices that are structured light active sensing systems include a transmitter and a receiver configured to transmit and receive patterns corresponding to spatial codes (or "codewords") to generate a depth map that indicates the distance of one or more objects in a scene from the imaging device. The farther away an object in a scene is from the transmitter and the receiver, the closer a received codeword reflected from the object is from its original position (compared to the transmitted codeword) because a propagation path of the outgoing codeword and the reflected incoming codeword are more parallel. Conversely, the closer the object is to the transmitter and receiver, the farther the received codeword is from its original position in the transmitted codeword. Accordingly, the difference between the position of a received codeword and the corresponding transmitted codeword may be used to determine the depth of an object in a scene. Structured light active sensing systems may use these determined depths to generate a depth map of a scene, which may be a three dimensional representation of the scene. Many applications may benefit from determining a depth map of a scene, including camera quality enhancement and computer vision.

Each codeword may be represented by rows and columns of intensity values. For example, binary spatial codes may use 0s and 1s, corresponding to bright and dark intensity values, to represent a binary pattern. Other spatial codes may use more than two different intensity values. Noise in a received codeword may cause an error in identifying the codeword because the "noisy" codewords won't be recognized as the spatial code that was transmitted. For example, for binary codes, such noise may cause a "1" in the transmitted code to be received as a "0", or vice versa. This may result in a gap, or hole, in a depth map which uses the erroneous codeword. Depth is not estimated at that point with an unrecognized code, leaving a "hole" in the depth map being generated.

Traditional methods of "filling" holes include estimating the depth at the hole based on neighboring depths, by, for example, by averaging depths around the hole. Such an approach may not provide good results if the hole is at or near a boundary of an object, or at any point where there are variations or discontinuities in depth. Accordingly, there is a need for methods and systems to generate depth when there are holes in the depth map, even at points of variation or discontinuity.

SUMMARY

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages that include efficient ways to determine a likely codeword from a codeword that cannot otherwise be identified.

One innovation is a method for correcting errors in a depth map generated by a structured light system. In various embodiments, the method may include receiving a plurality of valid codewords and at least one invalid codeword. Each of the plurality of valid codewords is included in a codebook of valid codewords. The codebook does not include the at least one invalid codeword. Each codeword represents at least one row and at least one column of pixels of a structured light image. Each codeword corresponds to a location in a depth map. The method may further include detecting the invalid codeword. The method may further include retrieving, from a memory unit, a set of candidate codewords that are included in the codebook. Each candidate codeword is a first Hamming distance from the invalid codeword. The first Hamming distance is a lowest Hamming distance between the invalid codeword and codewords in the codebook. The method may further include determining a depth estimate for a plurality of locations of the depth map including at least one location adjacent to the location of the invalid codeword. The method may further include associating a depth with each of the candidate codewords. The method may further include selecting the candidate codeword having an associated depth closest to the depth estimate. The method may further include assigning the depth associated with the selected candidate codeword to the location of the invalid codeword.

For some embodiments, each pixel represents received light energy. For some embodiments, each pixel has a binary value. For some embodiments, detecting the invalid codeword comprises retrieving from the memory unit an indication that the invalid codeword is not included in the codebook. For some embodiments, the first Hamming distance between the invalid codeword and each of the candidate codewords is the number of the at least one row and the at least one column of pixels with different binary values.

For some embodiments, the method may further include populating the memory unit with an indication of whether each received valid or invalid codeword is included in the codebook. For some embodiments, the method may further include populating the memory unit with the set of candidate codewords the first Hamming distance from the invalid codeword, the first Hamming distance being the lowest Hamming distance between the invalid codeword and codewords in the codebook. For some embodiments, the method may further include populating the memory unit with a second set of candidate codewords, the second set of candidate codewords corresponding to codewords that are included in the codebook, each of the corresponding second set of candidate codewords a second Hamming distance from the invalid codeword, the second Hamming distance higher than the first Hamming distance.

For some embodiments, determining the depth estimate comprises computing a median depth or an average depth of the plurality of locations of the depth map. For some embodiments, the plurality of locations of the depth map includes locations less than or equal to a threshold distance in locations from the location of the invalid codeword. For some embodiments, the threshold distance is 1, $\sqrt{2}$, 2, $\sqrt{5}$, 2, or $2\sqrt{2}$, corresponding to 4, 8, 12, 20, and 24 locations in the plurality of locations of the depth map, respectively.

Another innovation is an apparatus for correcting errors in a depth map generated by a structured light system. The apparatus may include a memory unit configured to store a plurality of valid codewords and at least one invalid codeword. Each of the plurality of valid codewords is included in a codebook of valid codewords. The codebook does not include the at least one invalid codeword. Each codeword represents at least one row and at least one column of pixels of a structured light image. Each codeword corresponds to a location in a depth map. The memory unit may be further configured to store a set of candidate codewords that are included in the codebook, each candidate codeword a first Hamming distance from the invalid codeword, the first Hamming distance being a lowest Hamming distance between the invalid codeword and codewords in the codebook. The apparatus may include a processor in communication with the memory unit. The processor may be configured to receive the plurality of valid codewords and the at least one invalid codeword. The processor may be configured to detect the invalid codeword. The processor may be configured to retrieve the set of candidate codewords. The processor may be configured to determine a depth estimate for a plurality of locations of the depth map, the plurality of locations of the depth map including at least one location adjacent to the location of the invalid codeword. The processor may be configured to associate a depth with each of the candidate codewords. The processor may be configured to select the candidate codeword having an associated depth closest to the depth estimate. The processor may be configured to assign the depth associated with the selected candidate codeword to the location of the invalid codeword.

For some embodiments, the processor may be further configured to populate the memory unit with an indication of whether each received valid or invalid codeword is included in the codebook. For some embodiments, the processor may be further configured to populate the memory unit with the set of candidate codewords the first Hamming distance from the invalid codeword, the first Hamming distance being the lowest Hamming distance between the invalid codeword and codewords in the codebook.

For some embodiments, the processor may be further configured to populate the memory unit with a second set of candidate codewords, the second set of candidate codewords corresponding to codewords that are included in the codebook, each of the corresponding second set of candidate codewords a second Hamming distance from the invalid codeword, the second Hamming distance higher than the first Hamming distance.

For some embodiments, the processor may be further configured to estimate the depth estimate by computing a median depth or an average depth of the plurality of locations of the depth map.

Another innovation is an apparatus for correcting errors in a depth map generated by a structured light system. The apparatus may include means for storing a plurality of valid codewords and at least one invalid codeword. Each of the plurality of valid codewords is included in a codebook of valid codewords. The codebook does not include the at least one invalid codeword. Each codeword represents at least one row and at least one column of pixels of a structured light image. Each codeword corresponds to a location in a depth map. The apparatus may include means for storing a set of candidate codewords that are included in the codebook, each candidate codeword a first Hamming distance from the invalid codeword, the first Hamming distance being a lowest Hamming distance between the invalid codeword and codewords in the codebook. The apparatus may include means for receiving the plurality of valid codewords and the at least one invalid codeword. The apparatus may include means for detecting the invalid codeword. The apparatus may include means for retrieving the set of candidate codewords. The apparatus may include means for determining a depth estimate for a plurality of locations of the depth map, the plurality of locations of the depth map including at least one location adjacent to the location of the invalid codeword, means for associating a depth with each of the candidate codewords. The apparatus may include means for selecting the candidate codeword having an associated depth closest to the depth estimate. The apparatus may include means for assigning the depth associated with the selected candidate codeword to the location of the invalid codeword.

For some embodiments, the valid and invalid codeword storing means comprises a memory unit. For some embodiments, the candidate codeword storing means comprises the memory unit. For some embodiments, the receiving means comprises a processing circuit. For some embodiments, the detecting means comprises the processing circuit. For some embodiments, the retrieving means comprises the processing circuit. For some embodiments, the determining means comprises the processing circuit. For some embodiments, the associating means comprises the processing circuit. For some embodiments, the selecting means comprises the processing circuit. For some embodiments, the assigning means comprises the processing circuit.

For some embodiments, the detecting means detects the invalid codeword by retrieving, from the storing means, an indication that the invalid codeword is not included in the codebook.

For some embodiments, the apparatus may include means for populating the storing means with an indication of whether each received valid or invalid codeword is included in the codebook. For some embodiments, the apparatus may include means for populating the storing means with the set of candidate codewords the first Hamming distance from the invalid codeword, the first Hamming distance being the lowest Hamming distance between the invalid codeword and codewords in the codebook. For some embodiments, the apparatus may include means for populating the storing means with a second set of candidate codewords, the second set of candidate codewords corresponding to codewords that are included in the codebook, each of the corresponding second set of candidate codewords a second Hamming distance from the invalid codeword, the second Hamming distance higher than the first Hamming distance.

For some embodiments, the determining means is configured to estimate the depth estimate by computing a median depth or an average depth of the plurality of locations of the depth map.

Another innovation is a non-transitory computer-readable medium storing instructions for correcting errors in a depth map generated by a structured light system. When executed, the instructions perform operations. The operations may include receiving a plurality of valid codewords and at least one invalid codeword. Each of the plurality of valid codewords is included in a codebook of valid codewords. The codebook does not include the at least one invalid codeword. Each codeword represents at least one row and at least one column of pixels of a structured light image. Each codeword corresponds to a location in a depth map. The operations may include detecting the invalid codeword. The operations may include retrieving, from a memory unit, a set of candidate codewords that are included in the codebook, each candidate codeword a first Hamming distance from the invalid codeword, the first Hamming distance being a lowest Hamming distance between the invalid codeword and codewords in the codebook. The operations may include determining a depth estimate for a plurality of locations of the depth map, the plurality of locations of the depth map including at least one location adjacent to the location of the invalid codeword. The operations may include associating a depth with each of the candidate codewords. The operations may include selecting the candidate codeword having an associated depth closest to the depth estimate. The operations may include assigning the depth associated with the selected candidate codeword to the location of the invalid codeword.

BRIEF DESCRIPTION OF THE DRAWINGS

Various features, aspects and advantages will become apparent from the description herein and drawings appended hereto, in which like reference symbols generally will identify corresponding aspects or components illustrated in the drawings. As a person of ordinary skill in the art will understand, aspects described or illustrated for an embodiment may be included in one or more other described or illustrated embodiments, if not impractical for the implementation or function of such an embodiment, unless otherwise stated.

DETAILED DESCRIPTION OF CERTAIN EMBODIMENTS

Figure 1:
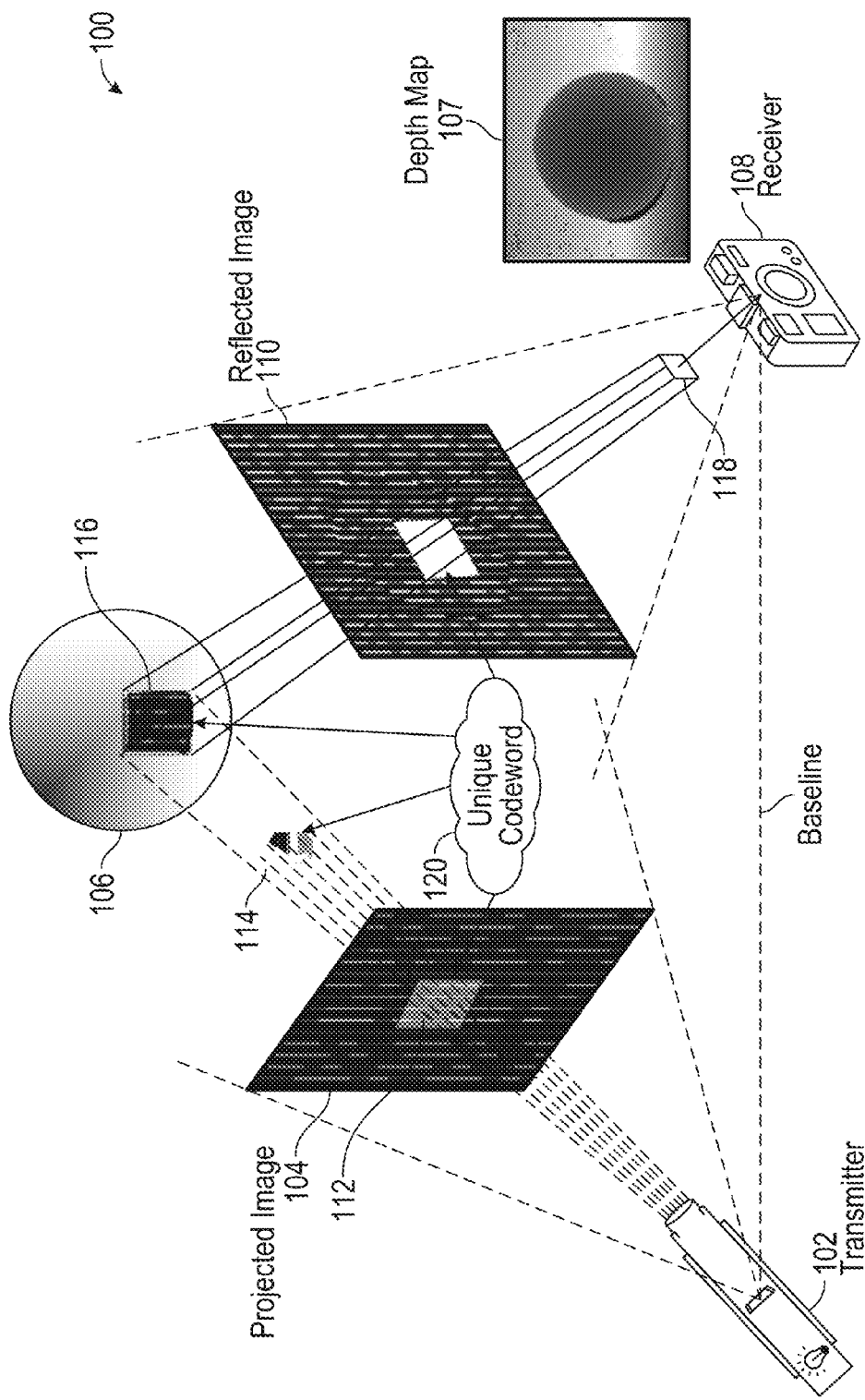
FIG. 1 is a schematic illustrating an example of an active sensing system where a known pattern is used to illuminate a scene and obtain depth information with which to generate 3-dimensional information from 2-dimensional images and/or information.

The following detailed description is directed to certain specific embodiments. However, the methods and systems disclosed can be embodied in a multitude of different ways. It should be apparent that the aspects herein may be embodied in a wide variety of forms and that any specific structure, function, or both being disclosed herein is merely representative. Aspects disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different computing devices. These include mobile phones, tablets, dedicated cameras, wearable computers, personal computers, photo booths or kiosks, personal digital assistants, ultra-mobile personal computers, and mobile internet devices. They may use general purpose or special purpose computing system environments or configurations. Examples of computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As discussed above, structured light systems project a known pattern (e.g., codewords) onto at least one object in a scene (sometimes referred to as being projected onto a scene for ease of description), and process the received image to obtain a depth map. Inevitably, due to speckle or other noise sources, certain regions of the received pattern are not decoded. These un-coded regions create holes in the depth map which contain no depth information thus degrading the utility of the map.

In some embodiments, the disclosed systems and methods may determine the most likely codeword (sometimes referred to as a "code" for ease of reference) that was transmitted by attempting to determine the most likely code that was transmitted, based on the codeword that was received. A set of valid codes that may be transmitted can be referred as a codebook. If a received code matches one of the codes in the codebook, then it is most likely that the code was received correctly. However, if the received code does not exactly match one of the codes in the codebook, then it is most likely that the received code does not match the transmitted code and there was an error due to speckle or some other source of noise.

For example, the transmitted code may be represented as a binary matrix corresponding to a code in a codebook of spatial codes. In such an implementation, each binary matrix may be represented as a matrix of binary values (0s and 1s) corresponding to "clear" and "masked." In the absence of noise, the received code may be identical to the transmitted code. If noise has affected the transmitted code or the corresponding received code that was reflected from an object, then the received code may differ from the transmitted code by one or more errors in binary value, where each bit error corresponds to a 0 received as a 1, or vice versa. The Hamming distance between the received code and the valid transmitted code corresponds to the number of bit errors. Therefore, the Hamming distance between the received code and the valid transmitted code is 0, 1, 2, and n for zero, one, two, and n bit errors, respectively. The Hamming weight of a codeword is defined as the number of 1s in the codeword. In order to compute the number of positions that differ between two binary codewords, they two codewords may be added using modulo-2 addition, which is binary addition without a carry, resulting in a 1 for each position with a difference, and a 0 for each position without a difference. The Hamming distance between two codewords is therefore the Hamming weight (number of 1s) of the modulo-2 addition of the two codewords.

The disclosed technology detects errors by comparing the received codes to the set of valid codes. The methods and systems described herein detect an error when there are no matches between the received code and the set of valid codes, corresponding to no codes with a Hamming distance of zero.

If there is not a match, the methods and systems described herein may be used to determine the valid code(s) that differ from the received code by a single bit, corresponding to a Hamming distance of one. If there is one valid code at a Hamming distance of one, that code is the most likely transmitted code. If there is more than one valid code at a Hamming distance of one, then a similarity measure between a local neighborhood and the candidate codewords may be used to select the most likely depth value. If there are no valid codes at a Hamming distance of zero or one, this process is repeated for a Hamming distance of two, and so on, up to a threshold number of bit errors.

The systems and methods described herein make use of efficient data structures for data detection and data correction. For each possible received spatial code, the data structure includes an indication whether the received spatial code matches a valid code. If the received spatial code does not match a valid code, the data structure includes representations of valid codes for single bit errors, corresponding to valid codes at a Hamming distance of 1. If there are no valid codes a Hamming distance of 0 or 1 from the received spatial code, the data structures includes representations of valid codes for single bit errors, and so on, up to a threshold number of bit errors. Once the data structure is populated, the methods described herein detect errors by querying the data structure for the indication whether the received spatial code matches a valid code. This operation may require only a single look-up in a table in the data structure. The methods described herein determine most likely candidates for the transmitted codewords by querying the data structure for the set of valid codes at the lowest Hamming distance for the received spatial code. By using the data structure in this manner, detecting errors and determining the most likely candidates for the transmitted spatial codes merely require data structure or table look-ups. An embodiment may implement the data structure in a compact manner to save space in increase efficiency.

In some embodiments of methods and systems, the underlying structure of the pattern is used to produce error correction. Such error correction results can be advantageous compared to other methods which operate without knowledge of the code (for example, median filtering).

Exemplary Operating Environment

FIG. 1 illustrates an example of an active sensing system where a known pattern is used to illuminate a scene and obtain depth information with which to generate 3-dimensional ("3D") information from 2-dimensional (2D) images and/or information. One or more aspects and/or features described herein may be implemented within such exemplary active sensing system. The system illustrated in FIG. 1 includes a transmitter 102 and a receiver 108. The transmitter 102 projects a light field through a code mask 104 to project codewords on an object or scene 106. Herein, for clarity of description, "scene" may be used to refer to either or both a scene and an object depending on the context used. For example, a scene may include a single object of interest, or a plurality of objects of interest. A receiver 108 captures the projected code mask 110 and codewords therein. This example illustrates how a section 112 of the code mask 104 is projected (as section 114) onto the surface (e.g., projected section 116) of the scene 106. The projected section 116 may then be captured by the receiver 108 as a captured segment 118. The section 112 may be used as a codeword 120 that can be uniquely identified. Thus, by covering the scene 106 with unique codewords in this manner, sections/portions of the scene 106 may be identified by reflected codewords and this information may be used for sensing the distance (depth) from the sensing device to objects in the scene.

From the image captured by the receiver 108, multiple segments may be identified over the scene 106. Each captured segment 118 may be uniquely identifiable at the receiver 108 and its location relative to other segments ascertained from the known pattern of the coded mask 104. The identification of a code from each segment/portion/window may involve pattern segmentation (e.g., to address distortion) and decoding of the perceived segment/portion/window into a corresponding code(s). Additionally, triangulation may be applied over each captured segment/portion/window to ascertain an orientation and/or depth. Multiple such segments/portions/windows may be combined to stitch together a captured image pattern. In this manner, a depth map 107 may be generated for the scene 106.

Figure 2:
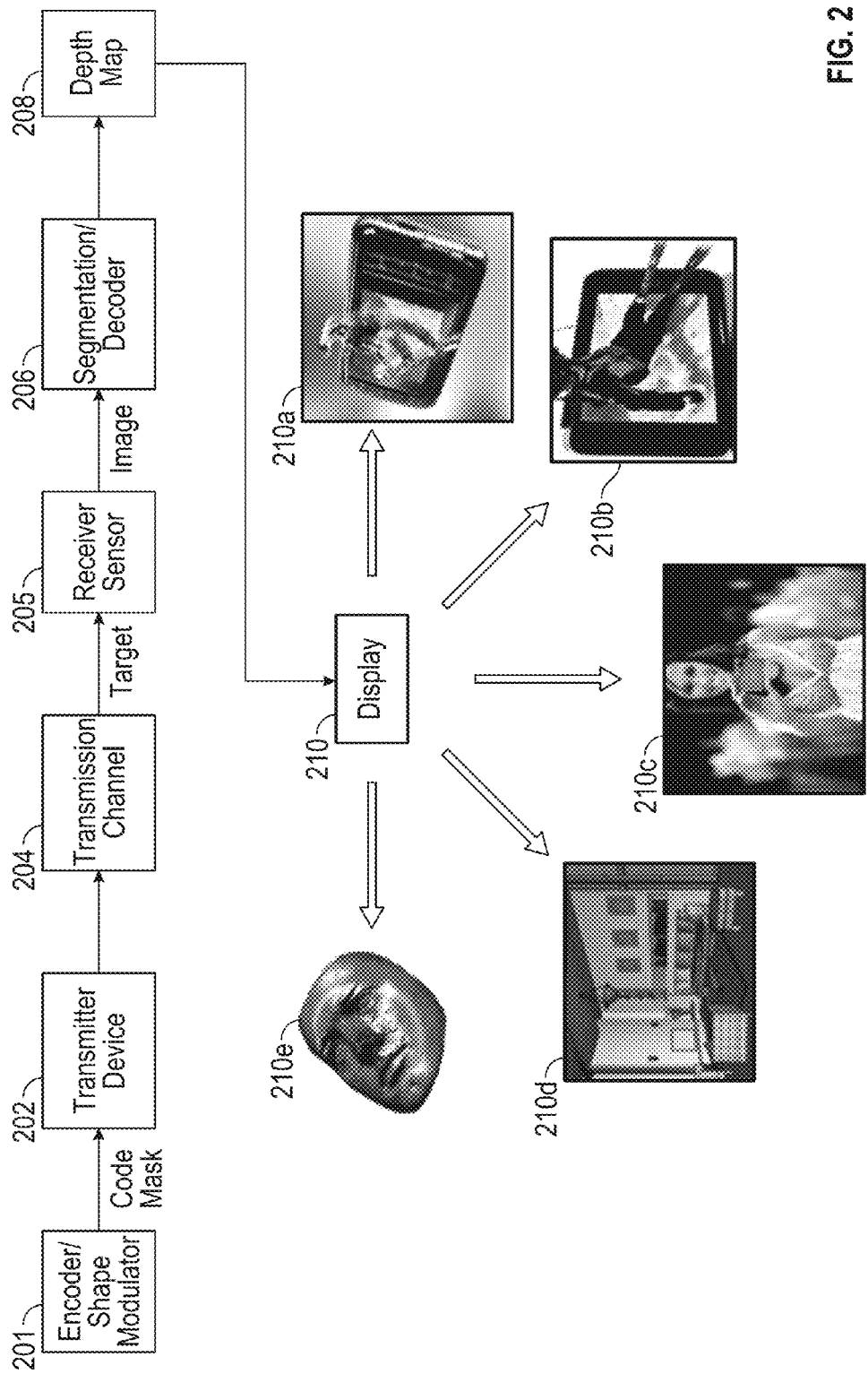
FIG. 2 is a diagram illustrating another example of a system for active sensing where a 3-dimensional (3D) scene is constructed from 2-dimensional (2D) images or information.

FIG. 2 illustrates another exemplary system for active sensing where a 3-dimensional (3D) scene is constructed from 2-dimensional (2D) images or information. An encoder/shape modulator 201 may serve to generate a code mask which is then projected by a transmitter device 202 over a transmission channel 204. The code mask may be projected onto a target (e.g., a scene) and the reflected light is captured by a receiver sensor 205 as an image (e.g., code mask image). At the receiver sensor 205 (e.g., receiver 108 in FIG. 1), the target (e.g., scene) is captured and its shape/depth is encoded 205. Shape/depth encoding may be achieved, for example, using the projected code mask to ascertain the depth information. For instance, the captured image of the scene (which includes the projected code mask) may be decoded 206 to obtain a depth map 208. The depth map 208 may then be used to present, generate, and/or provide a 3-dimensional version 210a-e of the target.

Active sensing relies on being able to recognize (at the receiver sensor 205 and/or decoder 206) all spatial codes (e.g., codewords) from the code mask being projected by the transmitter device 202 on a scene. If a scene is too close to the transmitter and receiver, the surface of the scene may be angled or curved, a baseline reference plane may be tilted, and the codes may be modified under an unknown affine transformation (e.g., rotation, skew, compression, elongation, etc.).

One or more aspects or features described herein may be implemented within the exemplary environments of FIGS. 1 and 2.

Exemplary Active Depth Sensing

Figure 3:
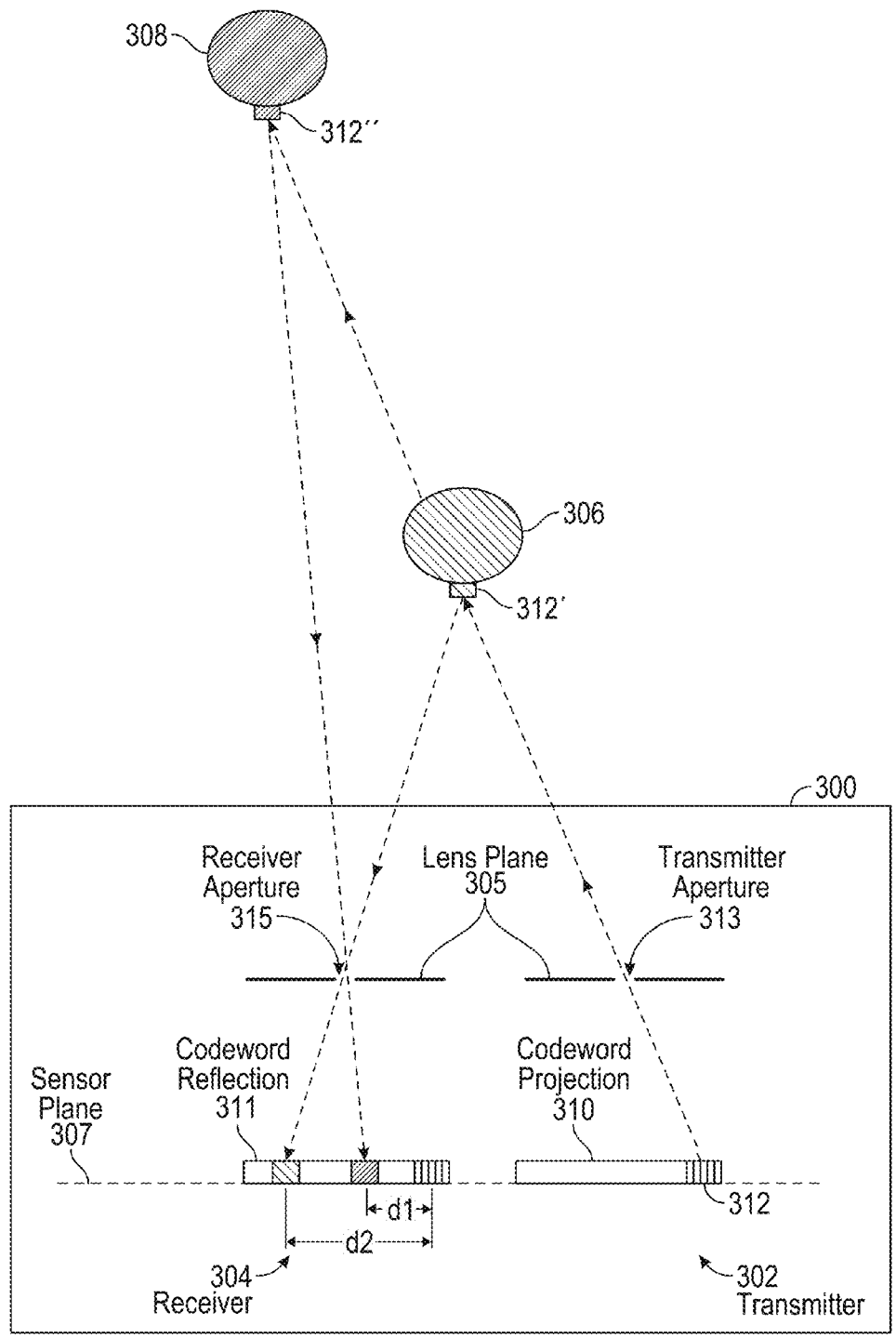
FIG. 3 is a schematic illustrating how depth may be sensed for an object or scene.

FIG. 3 illustrates an example of how depth may be sensed for one or more objects in a scene. FIG. 3 shows a device 300 including a transmitter 302 and a receiver 304. The device is illuminating two objects 306 and 308 with structured light emitted from transmitter 302 as codeword projection 310. The codeword projection 310 reflects from objects 306 and/or 308 and is received as a reflected codeword 311 by receiver 304 on sensor plane 307.

In the illustrated aspect, the transmitter 302 is on the same reference plane (e.g., lens plane 305) as the receiver 304. The transmitter 302 projects the codeword projection 310 onto the objects 306 and 308 through an aperture 313.

The codeword projection 310 illuminates the object 306 as projected segment 312', and illuminates the object 308 as projected segment 312". When the projected segments 312' and 312" are received by the receiver 304 through receiver aperture 315, the reflected codeword 311 may show reflections generated from the object 308 at a first distance d1 and reflections generated from the object 306 at a second distance d2.

As shown by FIG. 3, since the object 306 is located closer to the transmitter 302 (e.g., a first distance from the transmitter device) the projected segment 312' appears at a distance d2 from its initial location. In contrast, since the object 308 is located further away (e.g., a second distance from the transmitter 302), the projected segment 312" appears at a distance d1 from its initial location (where d1<d2). That is, the further away an object is from the transmitter/receiver, the closer the received projected segment/portion/window is from its original position at the receiver 304 (e.g., the outgoing projection and incoming projection are more parallel). Conversely, the closer an object is from the transmitter/receiver, the further the received projected segment/portion/window is from its original position at the receiver 304. Thus, the difference between received and transmitted codeword position may be used as an indicator of the depth of an object. In one example, such depth (e.g., relative depth) may provide a depth value for objects depicted by each pixel or grouped pixels (e.g., regions of two or more pixels) in an image.

Various types of modulation and coding schemes may be used to generate a codeword projection or code mask. These modulation and coding schemes include temporal coding, spatial coding, and direct codification.

In temporal coding, patterns are successively projected onto the measuring surface (e.g., over time). This technique has high accuracy and resolution but is less suitable for dynamic scenes.

In spatial coding, information is encoded in a local neighborhood based on shapes and patterns. Pseudorandom codes may be based on De-Bruijn or M-arrays define the codebook (e.g., m-ary intensity or color modulation). Pattern segmentation may not be easily attained, for example, where the shapes and patterns are distorted.

In direct codification, both horizontal and vertical pixel coordinates are encoded. Modulation may be by a monotonic phase or an intensity waveform. However, this scheme may utilize a codebook that is larger than the codebook utilized for other methods. In most methods, received codewords may be correlated against a defined set of possible codewords (e.g., in a codebook). Thus, use of a small set of codewords (e.g., small codebook) may provide better performance than a larger codebook. Also, since a larger codebook results in smaller distances between codewords, additional errors may be experienced by implementations using larger codebooks.

Exemplary Codes for Active Depth Sensing

Structured light patterns may be projected onto a scene by shining light through a codemask. Light projected through the codemask may contain one or more tessellated codemask primitives. Each codemask primitive may contain an array of spatial codes. A codebook or data structure may include the set of codes. Spatial codes, the codemask, and codemask primitives may be generated using basis functions. The periodicities of the basis functions may be chosen to meet the requirements for the aggregate pattern of Hermitian symmetry (for eliminating ghost images and simplifying manufacturing), minimum duty cycle (to ensure a minimum power per codeword), perfect window property (for optimum contour resolution and code packing for high resolution), and randomized shifting (for improved detection on object boundaries). A receiver may make use of the codebook and/or the attributes of the design intended to conform to the constraints when demodulating, decoding, and correcting errors in received patterns.

The size and corresponding resolution of the spatial codes corresponds to a physical spatial extent of a spatial code on a codemask. Size may correspond to the number of rows and columns in a matrix that represents each codeword. The smaller a codeword, the smaller an object that can be detected. For example, to detect and determine a depth difference between a button on a shirt and the shirt fabric, the codeword should be no larger than the size of the button. In an embodiment, each spatial code may occupy four rows and four columns. In an embodiment, the codes may occupy more or fewer rows and columns (rows×columns), to occupy, for example, 3×3, 4×4, 4×5, 5×5, 6×4, or 10×10 rows and columns.

The spatial representation of spatial codes corresponds to how each codeword element is patterned on the codemask and then projected onto a scene. For example, each codeword element may be represented using one or more dots, one or more line segments, one or more grids, some other shape, or some combination thereof.

The "duty cycle" of spatial codes corresponds to a ratio of a number of asserted bits or portions (e.g., "1s") to a number of un-asserted bits or portions (e.g., "0s") in the codeword. When a coded light pattern including the codeword is projected onto a scene, each bit or portion that has a value of "1" may have energy (e.g., "light energy"), but each bit having a value of "0" may be devoid of energy. For a codeword to be easily detectable, the codeword should have sufficient energy. Low energy codewords may be more difficult to detect and may be more susceptible to noise. For example, a 4×4 codeword has a duty cycle of 50% or more if 8 or more of the bits in the codeword are "1." There may be minimum (or maximum) duty cycle constraints for individual codewords, or duty cycle constraints, for example, an average duty cycle for the set of codes in the codebook.

The "contour resolution" or "perfect window" characteristic of codes indicates that when a codeword is shifted by an amount, for example, a one-bit rotation, the resulting data represents another codeword. An amount that the codeword is shifted may be referred to as a shift amount. Codes with high contour resolution may enable the structured light depth sensing system to recognize relatively small object boundaries and provide recognition continuity for different objects. A shift amount of 1 in the row dimension and 2 in the column dimension may correspond to a shift by one bit positions to the right along the row dimension, and two bit positions down along the column dimension. High contour resolution sets of codewords make it possible to move a window on a received image one row or one column at a time, and determine the depth at each window position. This enables the determination of depth using a 5×5 window at a starting point centered at the third row and third column of a received image, and moving the 5×5 window to each row, column location from the third row to the third to last row, and the third column to the third to last column. As the codewords overlap, the window may be sized based on the resolution of the object depths to be determined (for example, a button on a shirt).

The symmetry of codes may indicate that the code mask or codebook primitive has Hermitian symmetry, which may provide several benefits as compared to using non-Hermitian symmetric codebook primitives or patterns. Patterns with Hermitian symmetries are "flipped" or symmetric, along both X and Y (row and column) axes.

The aliasing characteristic of codemasks or codemask primitives corresponds to a distance between two codewords that are the same. When an optical pattern includes a tessellated codebook primitive, and when each codebook in the primitive is unique, the aliasing distance may be based on the size of the codebook primitive. The aliasing distance may thus represent a uniqueness criterion indicating that each codeword of the codebook primitive is to be different from each other codeword of the codebook primitive, and that the codebook primitive is unique as a whole. The aliasing distance may be known to one or more receiver devices, and used to prevent aliasing during codeword demodulation. The cardinality of a codemask corresponds to a number of unique codes in a codebook primitive.

Exemplary Transmitter Device

Figure 4:
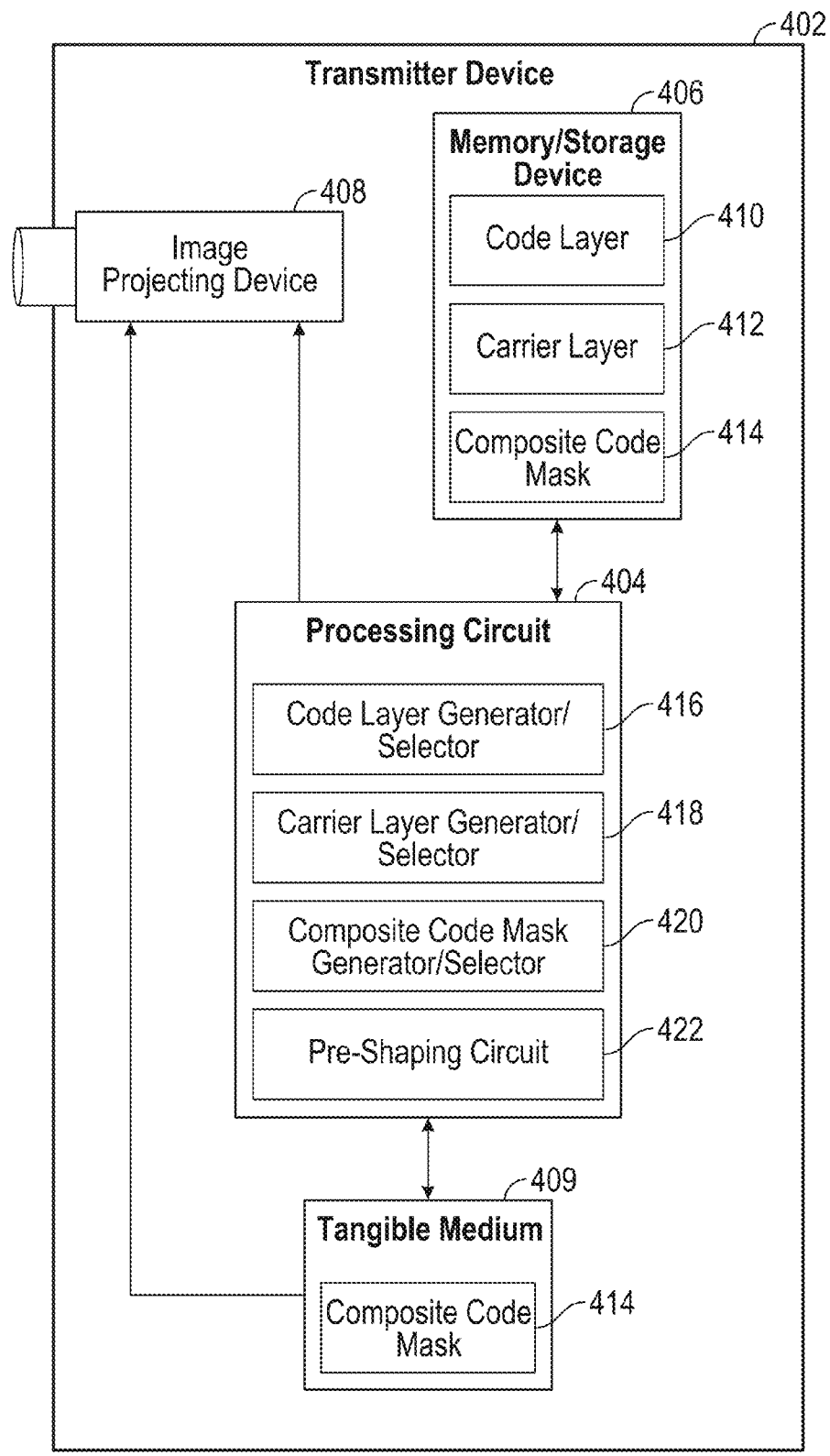
FIG. 4 is a block diagram illustrating an example of a transmitter device that may be configured to generate a composite code mask and/or project such composite code mask.

FIG. 4 is a block diagram illustrating an example of a transmitter device that may be configured to generate a composite code mask and/or project such composite code mask. The transmitter device 402 may include a processing circuit 404 coupled to a memory/storage device 406, an image projecting device 408, and/or a tangible medium 409. In some aspects, the transmitter device 402 may correspond to the transmitter 302 discussed above with respect to FIG. 3.

In a first example, the transmitter device 402 may be coupled to include a tangible medium 409. The tangible medium may define, include, and/or store a composite code mask 414. The composite code mask may include a code layer combined with a carrier layer. The code layer may include uniquely identifiable spatially-coded codewords defined by a plurality of symbols. The carrier layer may be independently ascertainable and distinct from the code layer and includes a plurality of reference objects that are robust to distortion upon projection. At least one of the code layer and carrier layer may be pre-shaped by a synthetic point spread function prior to projection.

In a second example, the processing unit (or processor) 404 may include a code layer generator/selector 416, a carrier layer generator/selector 418, a composite code mask generator/selector 420 and/or a pre-shaping circuit 422. The code layer generator/selector 416 may select a pre-stored code layer 410 and/or may generate such code layer. The carrier layer generator/selector 418 may select a pre-stored carrier layer 412 and/or may generate such carrier layer. The composite code mask generator/selector may select a pre-stored composite code mask 414 and/or may combine the code layer 410 and carrier layer 412 to generate the composite code mask 414. Optionally, the processing circuit 404 may include a pre-shaping circuit that pre-shapes the composite code mask 414, the code layer 410, and/or the carrier layer 412, to compensate for expected distortion in the channel through which the composite code mask is to be projected.

In some implementations, a plurality of different code layers and/or carrier layers may be available, where each such carrier or code layers may be configured for different conditions (e.g., for objects at different distances, or different configurations between the transmitter device and receiver device). For instance, for objects within a first distance or range, a different combination of code and carrier layers may be used than for objects at a second distance or range, where the second distance is greater than the first distance. In another example, different combination of code and carrier layers may be used depending on the relative orientation of the transmitter device and receiver device.

The image projecting device 408 may serve to project the generated/selected composite code mask onto an object of interest. For instance, a laser or other light source may be used to project the composite code mask onto the object of interest (e.g., through a projection channel). In one example, the composite code mask 414 may be projected in an infrared spectrum, so it may not be visible to the naked eye. Instead, a receiver sensor in the infrared spectrum range may be used to capture such projected composite code mask.

Exemplary Receiver Device Operation

Figure 5:
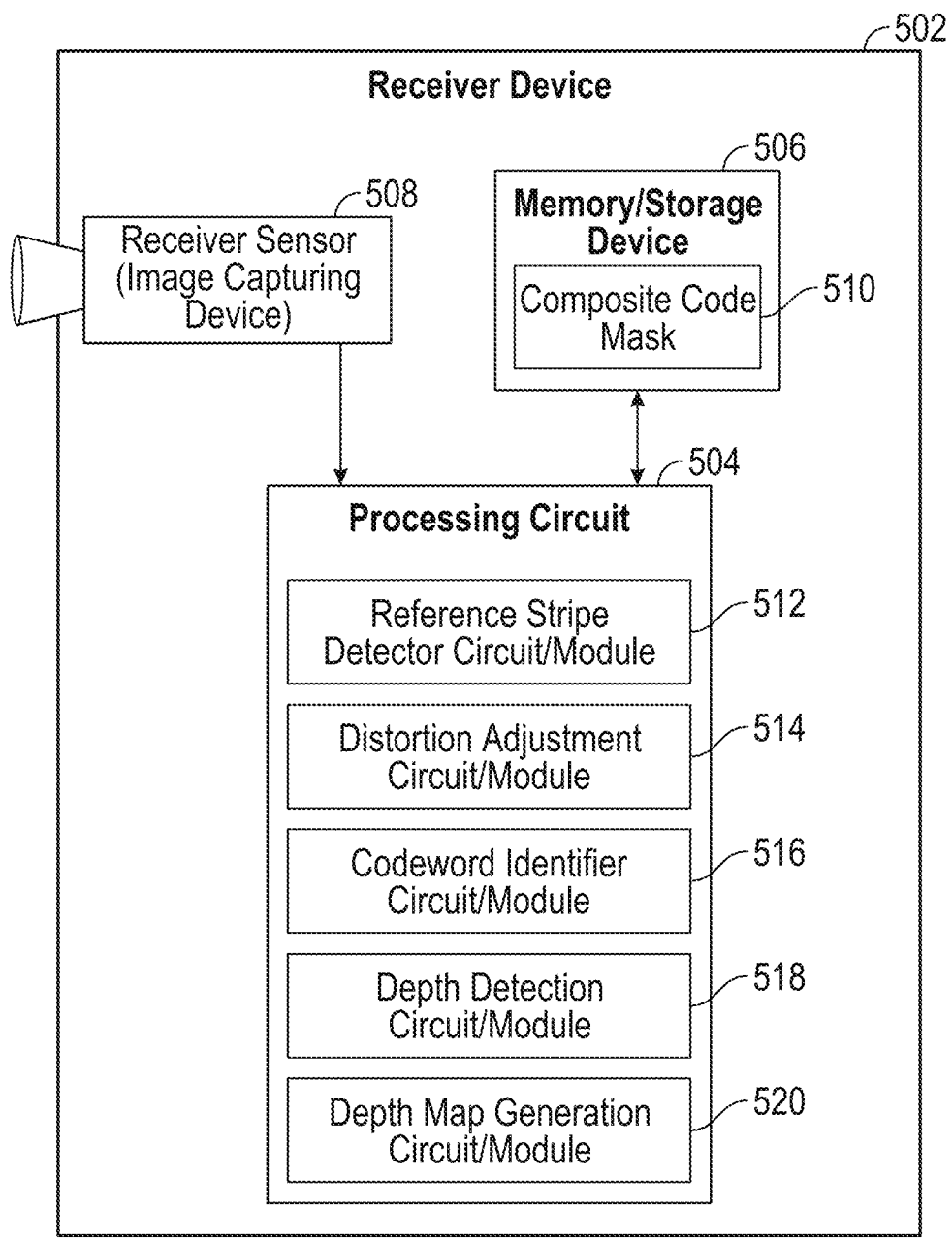
FIG. 5 is a block diagram illustrating an example of a receiver device that may be configured to obtain depth information from a composite code mask.

FIG. 5 is a block diagram illustrating an example of a receiver device 502 that is configured to receive a composite code mask reflected from an object and to determine be depth information from a composite code mask. The receiver device 502 may include a processing circuit 504 coupled to a memory/storage device and a receiver sensor 508 (e.g., an image capturing device 508). In some aspects, the receiver device 502 illustrated in FIG. 5 may correspond to the receiver 304 discussed above with respect to FIG. 3. In some embodiments, the receiver sensor 508 is an image capture device, for example, a camera.

The receiver sensor 508 may be configured to obtain at least a portion of a composite code mask projected on the surface of an object. For instance, the receiver sensor may capture an image of at least a portion of a composite code mask projected on the surface of a target object. The composite code mask may be defined by: (a) a code layer of uniquely identifiable spatially-coded codewords defined by a plurality of symbols, and (b) a carrier layer independently ascertainable and distinct from the code layer and including a plurality of reference objects that are robust to distortion upon projection. At least one of the code layer and carrier layer may have been pre-shaped by a synthetic point spread function prior to projection. In one example, the receiver sensor 508 may capture the composite code mask in the infrared spectrum.

Still referring to FIG. 5, in some embodiments, the code layer may comprise n1 by n2 binary symbols, where n1 and n2 are integers greater than two. In the composite code mask, each symbol may be a line segment in one of two gray-scale shades distinct from the reference objects. The symbols of the code layer may be staggered in at least one dimension. The carrier layer reference objects may comprise a plurality of equally spaced reference stripes with a guard interval in between. The reference stripes and the guard interval may be of different widths. The width of each reference stripe relative to a guard interval width may be determined by an expected optical spreading of a transmitter device and/or a receiver device.

The processing circuit 504 may include a reference stripe detector circuit/module 512, a distortion adjustment circuit/module 514, a codeword identifier circuit/module 516, a depth detection circuit/module 518, and/or a depth map generation circuit/module 520.

The reference stripe detector circuit/module 512 may be configured to detect reference stripes within the portion of the composite code mask. The distortion adjustment circuit/module 514 may be configured to adjust a distortion of the portion of the composite code mask based on an expected orientation of the reference stripes relative to an actual orientation of the reference stripes. The codeword identifier circuit/module 516 may be configured to obtain a codeword from a window defined within the portion of the composite code mask. The depth detection circuit/module 518 may be configured to obtain depth information for a surface portion of the target object corresponding to the window based on: (a) a single projection of the composite code mask, and (b) a displacement of the window relative to a known reference code mask.

The depth map generation circuit/module 520 may be configured to assemble a depth map for the object based on a plurality of codewords detected as different overlapping windows within the portion of the undistorted composite code mask.

In one example, pre-shaping of at least one of the code layer and carrier layer increases power efficiency during the projection of the composite code mask, such that more power is perceived by a receiver sensor in comparison to an unshaped composite code mask.

In one instance, the synthetic point spread function used may be selected from a plurality of point spread functions based on at least one of: (a) expected channel conditions through which the composite code mask is to be projected, (b) characteristics of surfaces onto which the composite code mask is projected, and/or (c) a sensitivity of the receiver sensor which is to receive the projected composite code mask. In another example, the synthetic point spread function may be selected from a plurality of point spread functions based on at least one of: (a) a first channel response for a projector that is to project the composite code mask; and/or (b) a second channel response for a path from a projector, that is to project the composite code mask, to the receiver sensor, that is to receive the composite code mask.

Exemplary Error Correction Device

Figure 6:
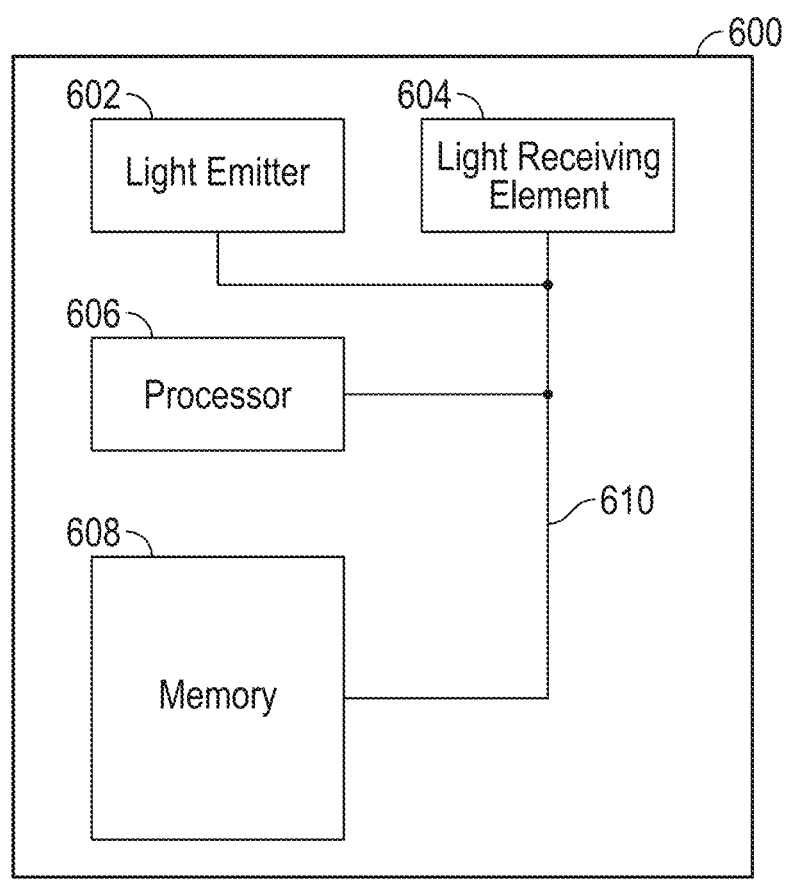
FIG. 6 is a block diagram of one embodiment of an apparatus configured to perform one or more of the error correction methods disclosed herein.

FIG. 6 is a block diagram illustrating an embodiment of an apparatus configured to perform one or more of the error correction methods disclosed herein. Apparatus 600 includes a light emitter 602, a light receiving element 604, a processor 606, and a memory 608. The light emitter 602, light receiving element 604, processor 606, and the memory 608 are operably connected via a bus 610. In some aspects, the light receiving element 604 may correspond to the receiver device 502 discussed above with respect to FIG. 5. In some aspects, the light emitter 602 may correspond to the transmitter device 402 discussed above with respect to FIG. 4.

The memory 608 may store instructions that configure the processor 606 to perform one or more functions of the methods discussed herein. For example, instructions stored in the memory may configure the processor 606 to control the light emitter 602 to emit light that encodes structured light as codewords, in order to illuminate a target object. Instructions stored in the memory 608 may further cause the processor 606 to control the light receiving element 604 to receive light reflecting from the target object and produce data encoded in the reflected light. Instructions stored in the memory may further configure the processor to correct errors in the data produced by the light receiving element according to the method 1500 discussed below.

Figure 7:
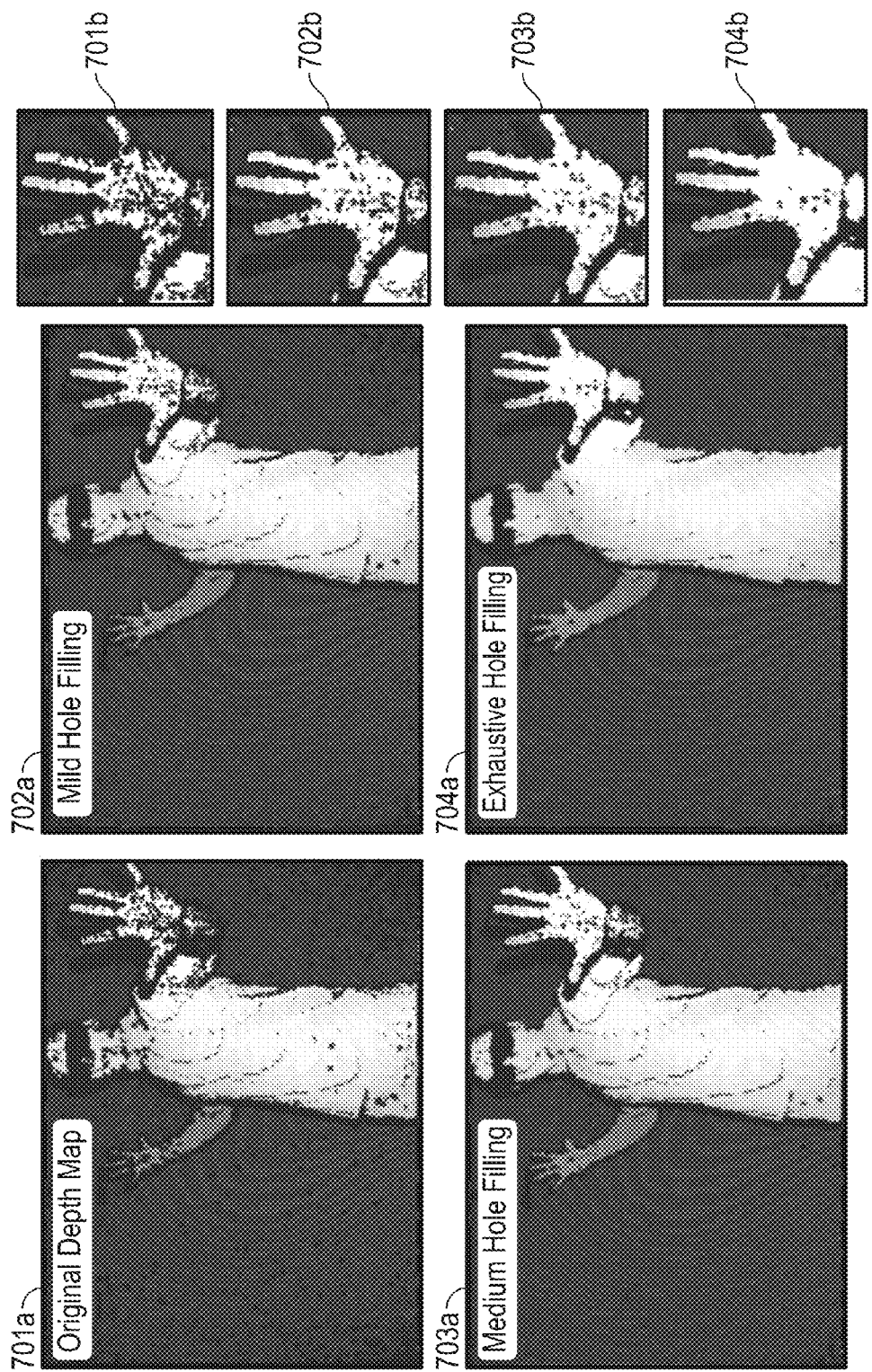
FIG. 7 illustrates varying degrees of error correction using a median filter.

FIG. 7 shows the results of application of some methods for mitigating the effects of gaps in an image depth map. Image 701a shows a depth map without any error correction. Holes in the depth map can be seen as dark regions, for example, in the hand 701b. Image 702a shows the same depth map after a mild hole filling process has been performed. While the hand 702b includes fewer holes in the depth map than hand 701b, some loss of detail is also present. Image 703a shows the same depth map as image 701a after medium level hole filling has been performed. The hand 703b from the image 703a shows a further reduction in the number of depth map gaps, but also loss of detail relative to the hands 701b and 702b. Image 704a shows the same depth map as image 701a after exhaustive hole filling. The hand 704b from the image 704a shows further reduction of depth map gaps as compared to hands 701b, 702b, and 703b. However, further loss of detail relative to hands 701b, 702b, and 703b is also evident.

Figure 8C:
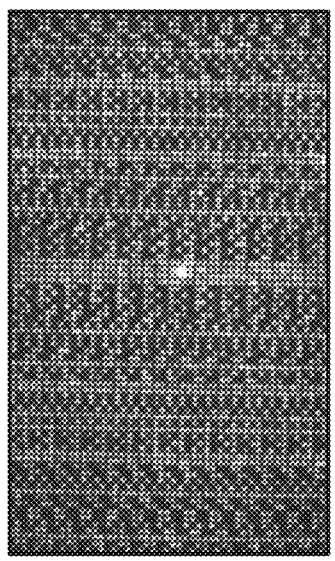
FIG. 8C illustrates an example of a code mask pattern with Hermitian symmetry.
Figure 8E:
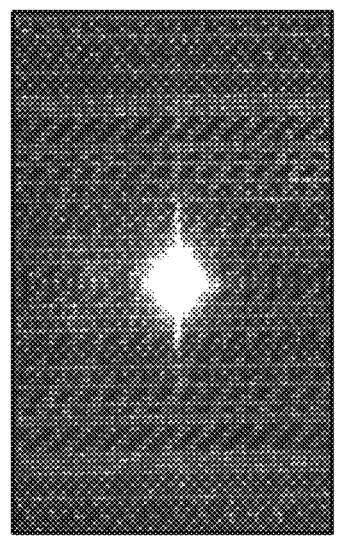
FIG. 8E illustrates an example of a code mask pattern without Hermitian symmetry.
Figure 8B:
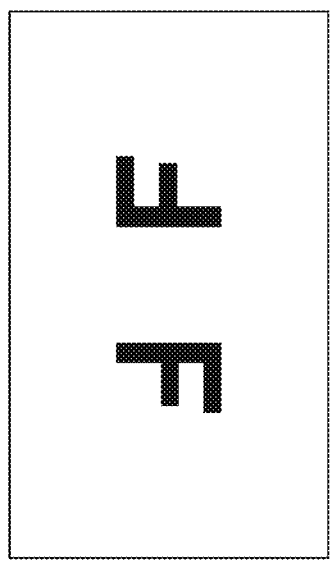
FIG. 8B illustrates an example of a Hermitian symmetric pattern without ghost images.
Figure 8D:
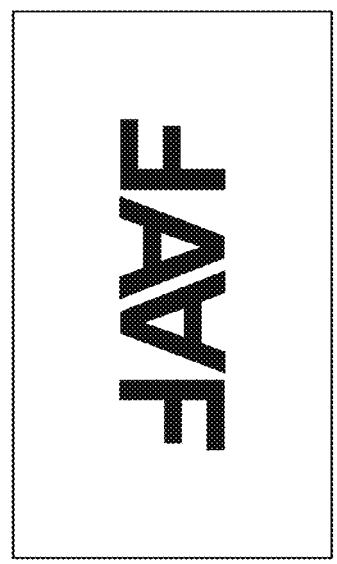
FIG. 8D illustrates an example of a non-Hermitian symmetric pattern with ghost images.
Figure 8A:
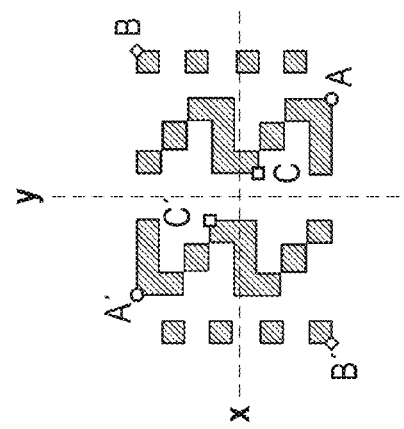
FIG. 8A illustrates an example of a pattern with points that exhibit Hermitian symmetry.

FIG. 8A illustrates a pattern that exhibits Hermitian symmetry. Each point A, B, C with a positive (x,y) is included in a codebook primitive, and is reflected about an origin (e.g., a point (0)) to a point (−x,−y) that is also in the codebook primitive. The Hermitian symmetry exhibited by each of the points A, B, C, may inhibit formation of "ghost" images that may be received when non-Hermitian patterns are used. For example, FIG. 8B illustrates a pattern without ghost images, formed from a Hermitian symmetric code mask. In contrast, FIG. 8D illustrates a pattern with ghost images, formed from a code mask that isn't Hermitian symmetric. Eliminating ghost images may reduce receiver side signal processing, may increase codeword recognition and demodulation accuracy, increase tolerance to moving objects, increase tolerance to noise, and increase tolerance to illumination changes.

FIGS. 8C and 8E show how a Hermitian symmetric pattern may affect the size of a zero order beam in a structured light projection. As shown, the Hermitian symmetric pattern of FIG. 8C generated a smaller zero order beam when compared to a zero order beam shown in FIG. 8E with a non-Hermitian symmetric pattern. The zero order beam is generated when light, for example, laser light, passes through a code mask, and a portion of the light passes through the center of the codemask un-diffracted. This causes the zero order beam. Because the zero order beam is not diffracted, the zero-order beam may have higher intensity than diffracted beams, resulting in a blind spot and saturation of a receive image sensor about the position of the zero order beam. The reduced size and lower intensity of the zero order beam in FIG. 8C may reduce the size of the blind spot, and improve eye safety in systems using a laser light as compared to the non-Hermitian symmetric pattern used in FIG. 8E.

Figure 9:
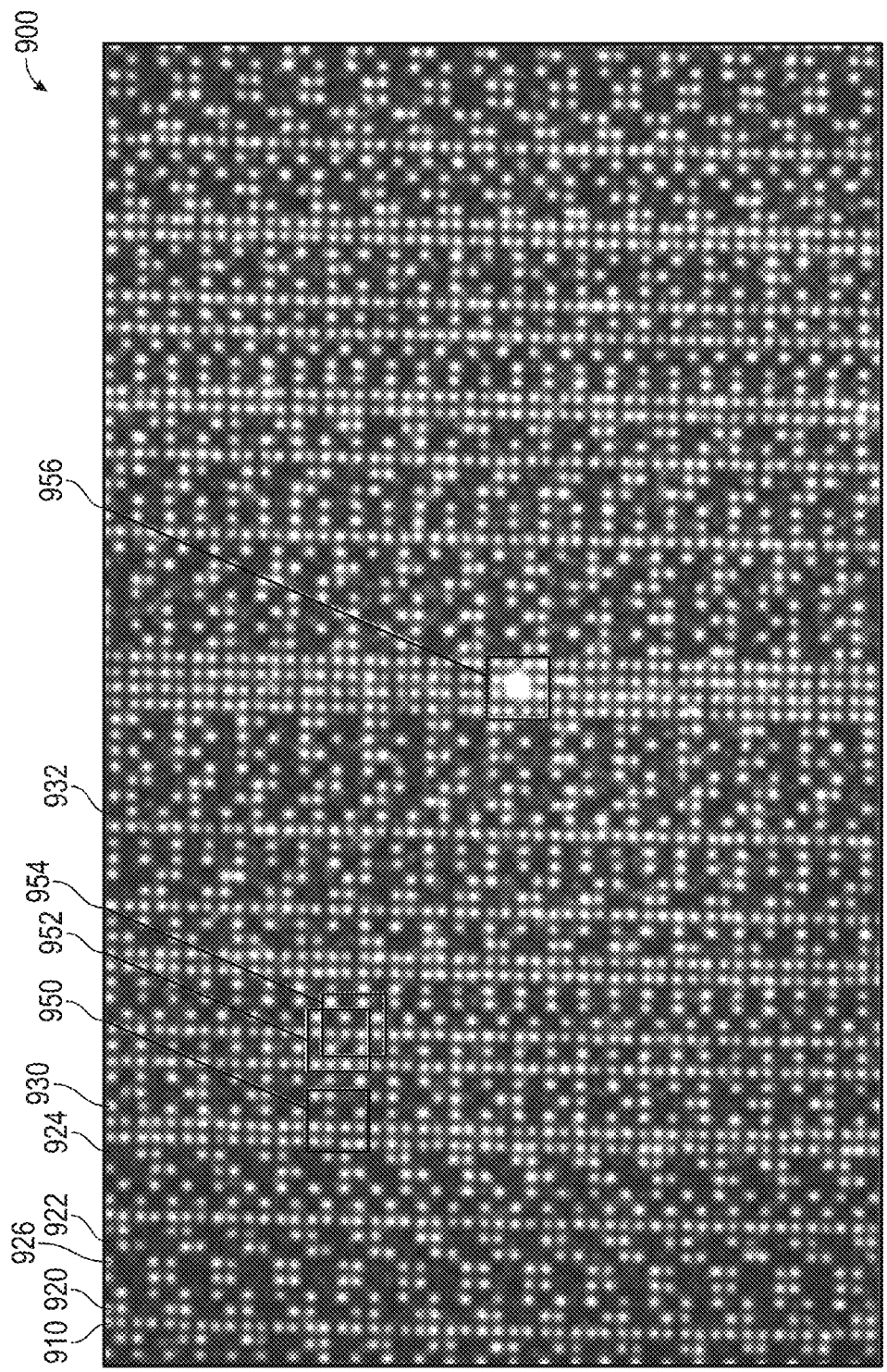
FIG. 9 illustrates a detailed view of the exemplary code mask illustrated in FIG. 8C, with columns of different basis functions and windowed 4×4 spatial codes.

FIG. 9 illustrates a detailed view of the exemplary code mask illustrated in FIG. 8C. Encoded data within the columns of the code mask 900 may be generated based on a set of basis functions. The basis functions are used to form spatial codes. The design of basis functions (basis sequences) may be analogous to eigenvectors for a matrix, in that the basis functions may be chosen to be orthogonal to each other, and may be combined linearly.

The codemask of FIG. 9 illustrates a code mask generated from three basis functions. A white square in the pattern represents a value of one (1) while a dark square represents a value of zero (0). In the illustrated code mask of FIG. 9, each column encodes values from one of the three basis functions:

$$910\begin{bmatrix}1\\1\\1\\1\end{bmatrix}, 920\begin{bmatrix}1\\1\\0\\0\end{bmatrix}, \text{ or } 930\begin{bmatrix}1\\0\\1\\0\end{bmatrix}.$$

When generating a particular column, each basis function may be rotated. Rotating 910 does not result in a change, as all bits are equivalent. Basis function $$920\begin{bmatrix}1\\1\\0\\0\end{bmatrix}$$

may be rotated, one bit at a time, to $$922\begin{bmatrix}0\\1\\1\\0\end{bmatrix}, 924\begin{bmatrix}0\\0\\1\\1\end{bmatrix}, \text{ or } 926\begin{bmatrix}1\\0\\0\\1\end{bmatrix}.$$

Similarly, basis function $$930\begin{bmatrix}1\\0\\1\\0\end{bmatrix}$$

may be rotated to $$932\begin{bmatrix}0\\1\\0\\1\end{bmatrix}.$$

Each column in the code mask 900 corresponds to a repeating series of one of these functions 910, 920, 922, 924, 926, 930 or 932.

The patterns resulting from the (sometimes rotated) basis functions are organized into codes comprised of four column portions, each column portion consisting of one four cell basis function pattern. For example, a code 950 may be represented as $$\begin{bmatrix}1&1&0&1\\1&1&1&1\\1&1&0&0\\1&1&1&0\end{bmatrix},$$

corresponding to functions [910|910|932|920].

Code 950 may be stored in a codebook in image form, as a 4×4 binary matrix, as binary representation of the binary matrix (for example, by column 1111111101011100, or by row 1101111111001110), as a combination of basis functions with a phase (910, 910, 930+1, 920), or as a combination of functions (910, 910, 932, 920).

In a similar manner, code $$952\begin{bmatrix}1&0&1&1\\1&1&1&0\\1&0&1&1\\1&1&1&0\end{bmatrix}$$

is formed from basis functions [910|932|910|930], code $$954\begin{bmatrix}1&1&0&1\\0&1&1&0\\1&1&0&1\\0&1&1&0\end{bmatrix}$$

is formed from basis functions [930|910|932|930], and code $$956\begin{bmatrix}1&1&1&1\\1&1&1&1\\1&1&1&1\\1&1&1&1\end{bmatrix}$$

is formed from [910|910|910|910].

A code may be identified for every four by four element "window" in the codemask of FIG. 9. The identifiable codes "overlap" as shown by codes 952 and 954, in that each 4×4 portion of code mask 900 represents a valid code. Because of the contour resolution (perfect window) constraint to which the codemask 900 is designed, each 4×4 "window" forms a valid code from a combination of functions 910, 920, 922, 924, 926, 930, or 932.

The perfect window constraint used in the design of the code mask pattern of FIG. 9 also requires shifted codewords to be unique. One window into the code mask corresponds to a four by four window shown in locations corresponding to codes 950, 952, 954, and 956. As the window shifts by one or more rows, and/or one or more columns, the four by four codeword within the window needs to be unique and non-repeating over an anti-alias area. If the codewords are not unique, then it may not be possible to uniquely identify each codeword location (window location corresponding to each unique codeword) within the anti-alias area. For this example with seven functions 910, 920, 922, 924, 926, 930, and 932, and four columns, there are $7^4$=2,401 possible combinations of four columns, making it possible to meet the perfect window constraint over anti-aliasing areas of up to 2,401 columns.

Two other candidate basis functions for 4×4 codes that were not used in this example are $$\begin{bmatrix} 1 \\ 1 \\ 1 \\ 0 \end{bmatrix}, \text{ and } \begin{bmatrix} 0 \\ 0 \\ 0 \\ 0 \end{bmatrix}.$$

No columns in the pattern use these functions, or shifted versions of these functions. Therefore, any received code that includes either $$\begin{bmatrix} 1 \\ 1 \\ 1 \\ 0 \end{bmatrix} \text{ or } \begin{bmatrix} 0 \\ 0 \\ 0 \\ 0 \end{bmatrix}$$

is invalid. Accordingly, a receiver may detect an error when a received code is not in a codebook of valid codes, when all transmitted codes are formed from a basis function (or rotated version of the basis function) that is in the codebook.

Figure 10:
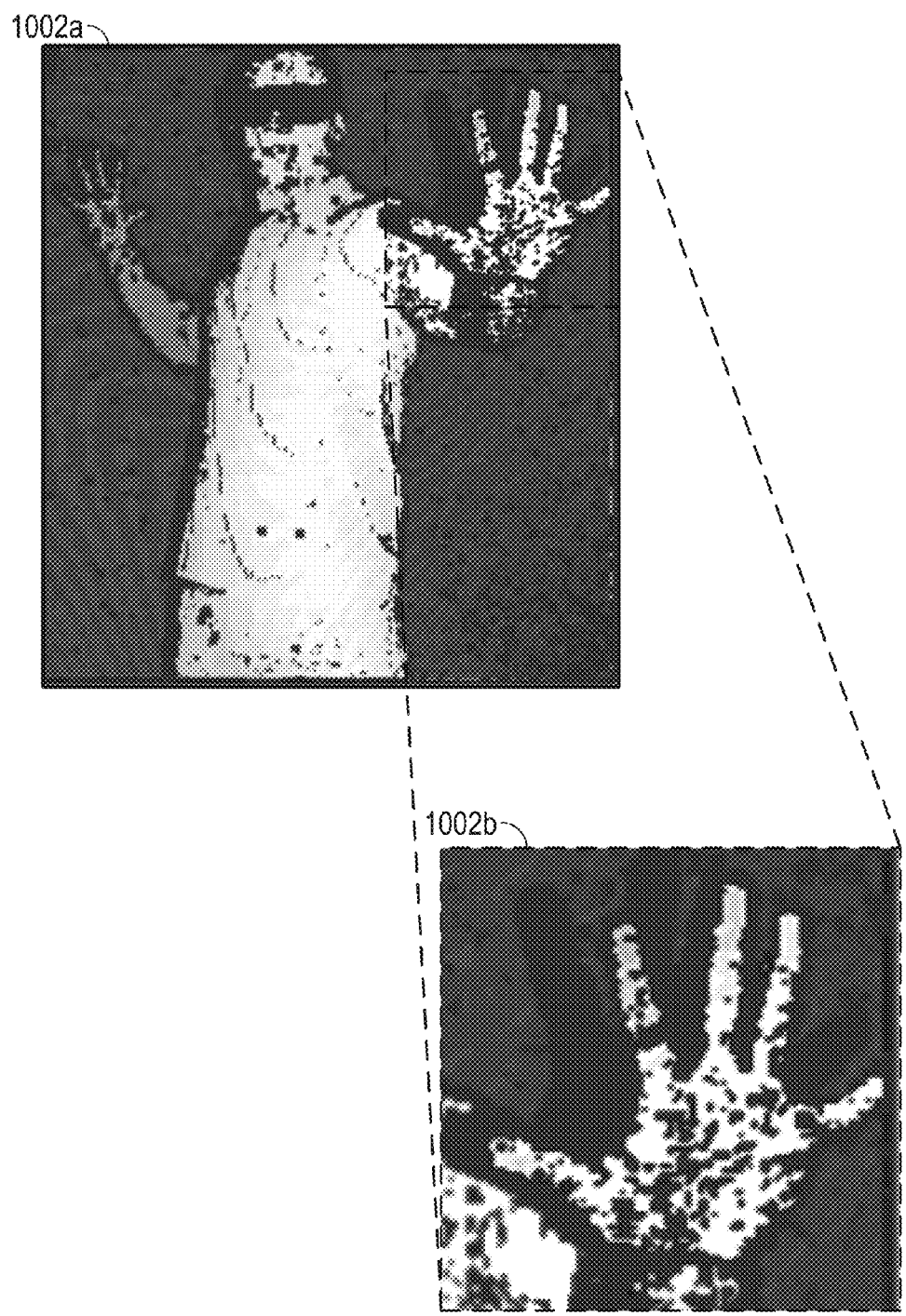
FIG. 10 shows gaps in a depth map derived from structured light.

The code mask 900 of FIG. 9 may be transmitted onto one or more objects in a scene, and then reflected back to a receiver. The receiver, for example, receiver device 502 or light receiving element 604, receives the reflection of the transmitted pattern from the objects in the scene. After reception, received versions of codes 950, 952, 954, and 956 may be determined. By observing how the encoded codewords change when reflected by an object, a depth map for example, the depth map 1002a shown in FIG. 10 may be generated. The generated depth map may be provided to one or more image processing methods, which may modify image data based on the depth map. The generated depth map may include one or more gaps or holes. The gaps or holes may result from errors in decoding of the received versions of the codes. The errors may be caused by a variety of factors, including portions of the object with low reflectivity, spurious ambient light conditions, or a variety of other factors. Examples of holes in a depth map can be seen in the expanded image of the hand 1002b (FIG. 10). Without a way for correcting these errors, image processing of regions of the image in proximity to the holes may produce erroneous depths in these areas of a depth map.

When the codewords of code mask 900 are received, each received codeword may be demodulated, or interpreted, to determine the particular code that was received.

In some embodiments, received spatial codes, or symbolic (binary, or n-ary) representations of the received spatial codes, may be matched to basis functions (for example, using matched filters), shifted versions of basis functions, or each valid spatial code array to determine if the received code corresponds to a valid code. The code mask 900 may be generated to include valid codes representing only a subset of all possible combinations of basis functions. In the example of the 4×4 codes of FIG. 9, the seven functions 910, 920, 922, 924, 926, 930, and 932 correspond to $7^4$=2,401 possible codes out of $2^{16}$=65,536 possibilities.

A codebook used to generate the code mask 900 may select a subset of the 2,401 codes (for example, 400), in which case less than 1% of the possible codes are valid. If valid codes are dissimilar enough, a single bit error may not result in another valid code. Thus, it may be possible to determine the received code has an error if it does not match a valid code, and it is relatively unlikely or perhaps impossible for a single bit error to cause a first valid code to be mistaken for a second valid code.

The error correction systems and methods described herein detect an error when an invalid code is received, and correct the error by determining the most likely, valid, transmitted codeword that corresponds to the received invalid code. A determination of the most likely valid transmitted codeword may assume, in some aspects, that the invalid codeword includes only one error. This assumption bounds the computational requirements of determining the most likely valid codewords. Furthermore, given the relatively low probability of multiple errors in a single codeword, this assumption provides for methods and systems with an adequate ability to correct errors.

Figure 11:
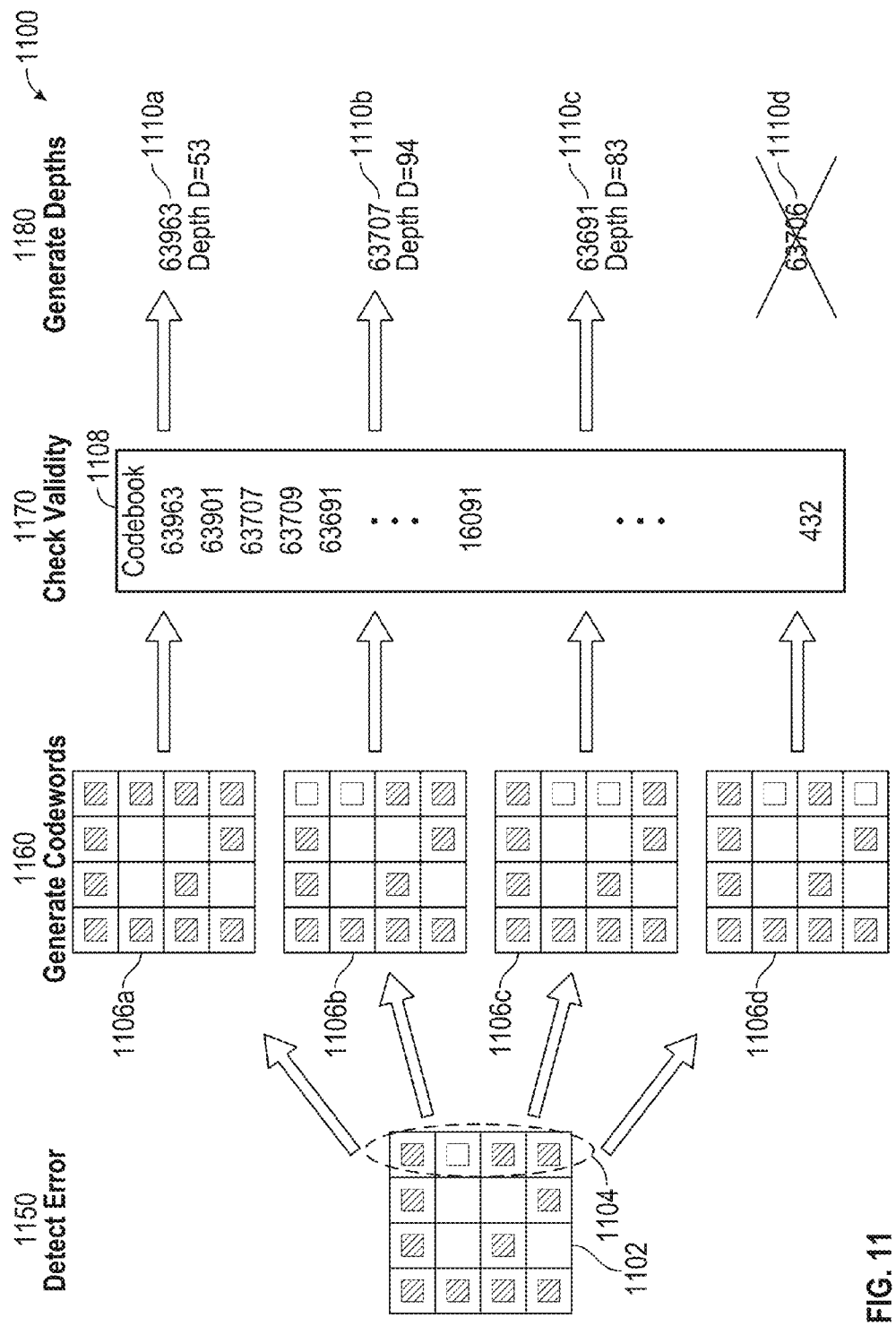
FIG. 11 is an example of a dataflow diagram of a method of depth map hole filling.

FIG. 11 is a dataflow diagram illustrating an example an embodiment of a method of correcting erroneous data in a depth map. In other words, filling "holes" in a depth map. The method includes detecting an error in a received spatial codeword, in error detection process 1150. After detecting an error, the method includes generating candidate codewords, in candidate codeword generation step 1160. Each of the candidate codewords are checked against the set of valid codewords in check validity process 1170, which determines which of the candidate codewords are valid candidates. Next, depths are generated for each of the valid codewords in generate depth process 1180. FIG. 11 illustrates a dataflow for the example 4×4 spatial codes generated using the basis functions described with respect to FIG. 9, that is, the basis functions $$910\begin{bmatrix} 1 \\ 1 \\ 1 \\ 1 \end{bmatrix}, 920\begin{bmatrix} 1 \\ 1 \\ 0 \\ 0 \end{bmatrix}, \text{ and } 930\begin{bmatrix} 1 \\ 0 \\ 1 \\ 0 \end{bmatrix},$$

as well as shifted functions $$922\begin{bmatrix} 0 \\ 1 \\ 1 \\ 0 \end{bmatrix}, 924\begin{bmatrix} 0 \\ 0 \\ 1 \\ 1 \end{bmatrix}, 926\begin{bmatrix} 1 \\ 0 \\ 0 \\ 1 \end{bmatrix} \text{ and } 932\begin{bmatrix} 0 \\ 1 \\ 0 \\ 1 \end{bmatrix}.$$

FIG. 11 first illustrates an error detection process 1150. Within error detection process 1150, a received image is decoded to form invalid spatial code 1102. The invalid spatial code 1102 may result from a reflection of at least one of the spatial codes described above with respect to FIG. 9. Each received spatial column in the invalid spatial code 1102 is compared to the set of basis functions of FIG. 9 using a match filter. The first, second, and third columns of invalid spatial code 1102 match functions 910, 930, and 926, respectively. However, column 1104 does not match any of functions 910, 920, 922, 924, 926, 930, or 932, signifying an error in at least one of the elements of column 1104.

Once the error detection process 1150 detects an error in column 1104 of invalid spatial code 1102, candidate valid codewords are generated in candidate codeword generation process 1160, illustrated vertically in FIG. 11.

Candidate codeword generation process 1160 includes a design assumption that only one error exists in column 1104. Other contemplated embodiments may make different assumptions, for example, other embodiments may assume no more than two, three, or four errors exist in column 1104. However, detecting and correcting for a larger number of errors may require a higher computational cost and complexity. In some aspects, candidate codewords may be generated to be within a particular Hamming distance of the invalid code. For example, in implementations assuming at most one error in an invalid codeword, candidate codewords may be generated that have a Hamming distance of one (1) from the invalid codeword. In implementations that contemplate at most two errors in column 1104, candidate codewords may be generated that are within a Hamming distance of two (2) from the invalid spatial code 1102, and so on.

As shown in FIG. 11, candidate codewords 1106*a-d* are generated in candidate codeword generation process 1160. Each of candidate codewords 1106*a-d* has a Hamming distance of one (1) from the invalid spatial code 1102. This corresponds to the single bit error design assumption discussed above. Alternatively the candidate codewords 1106*a-d* may be generated by a variety of other methods, depending on implementation. In one implementation, each candidate codeword is generated by perturbing a unique bit of the column 1104 including the error. Thus, if the column 1104 was to include eight bits, eight candidate codewords may be generated, each candidate codeword including a different perturbed bit.

After the candidate codewords 1106*a-d* are generated, each of the candidate codewords may then be checked for validity by a check validity process 1170. In some embodiments, the validity check is done by determining whether the candidate codewords are included in a codebook 1108 of valid codes used to generate the code mask 900. If exactly one of the candidate codewords 1106*a-d* is a valid code (listed in the codebook 1108) then the single matching candidate is likely the valid code that was originally transmitted. In the example of FIG. 11, candidate codewords 1106*a-c* were found to be valid in codebook 1108, while candidate codeword 1106*d* was not found in codebook 1108. Note that if none of the candidate codewords were determined to be valid (i.e. in the codebook 1108), some implementations may determine that the column 1104 includes more than a single error. In response to this determination, some implementations may perform a second candidate codeword generation step. For example, candidate codewords within a Hamming distance of two (2) from the invalid codeword may be generated and compared to the codebook 1108. Some implementations may perform additional steps for candidate codewords with greater Hamming distances from the invalid codewords. Some implementations may determine candidate codewords at the closest Hamming distance in a single step.

In some embodiments, the check validity process 1170 may be performed based on a codeword allocation scheme. For example, in some aspects, codewords in a horizontal direction may be unique in an x-dimension and repeating in a y-dimension. Some candidate codewords may not conform to such an overall codeword allocation schemes, and may be rejected during the check validity process 1170.

After the check validity process 1170 is performed, the method performs generate depth process 1180 determining a depth associated with each candidate valid codewords 1110*a-c*. The candidate depths associated with codewords 1110*a-c* may be compared to depths within a local neighborhood to determine which one of the candidate codewords 1110*a-c* should replace the invalid spatial code 1102. For example, whichever candidate depth of candidate codewords 1110*a-c* is closest to local neighborhood depth values of invalid spatial code 1102 may be used to replace invalid spatial code 1102 in a depth map. In some cases, the local neighborhood may be limited to 1, 2, 3, 4, 5, 6, 7, 8, 9, or 10 codewords from invalid spatial code 1102. In some aspects, the local neighborhood may be limited to codewords within a percent of a depth map width or height. For example, if a depth map is 100 codewords across, the local neighborhood may be defined to be one (1) percent of this dimension, or within one codeword of invalid spatial code 1102. More detail on the generate depths is described below with respect to FIG. 12.

Note that invalid spatial code 1102 may include errors in more than one column. For example a first and third column of a 4×4 codeword may each include an error. In this case, candidate codewords may be generated for the eight potential candidates (four for each column in the case of a 4×4 codeword), each candidate is validated against the codebook, depths are generated for each valid candidate, and the most similar depth is selected for replacement. A method may set an upper limit on the number of bit errors to consider.

In some embodiments, the bit errors may correspond to Hamming distances. For example, a Hamming distance of 2 corresponds to two bit errors. If there are no valid codes at a Hamming distance of 2, then the method may consider valid codes at a Hamming distance of 3, up until reaching a threshold Hamming distance, which corresponds to a threshold number of bit errors.

After check validity process 1170 is performed, the method may generate depths in generate depth process 1180 based on the displacement of candidate codes in the received structured light image, as described with respect to FIG. 3. For example, first candidate code 63693, labelled 1110*a*, may have a corresponding depth of 53. Second candidate code 63707, labelled 1110*b*, may have a corresponding depth of 94. Third candidate code 63691, labelled 1110*c*, may have a corresponding depth of 83. In the example of FIG. 11, the code 63706 is not in the codebook, so it is not a valid candidate. Given the three candidate depths D=53, D=94, and D=83, respectively, the next step, illustrated in FIG. 12, is to determine which of the three codes 1110*a-c*, with corresponding depths 53, 94, and 83, to select to fill the hole or gap in the depth map at location of the code error.

Figure 12:
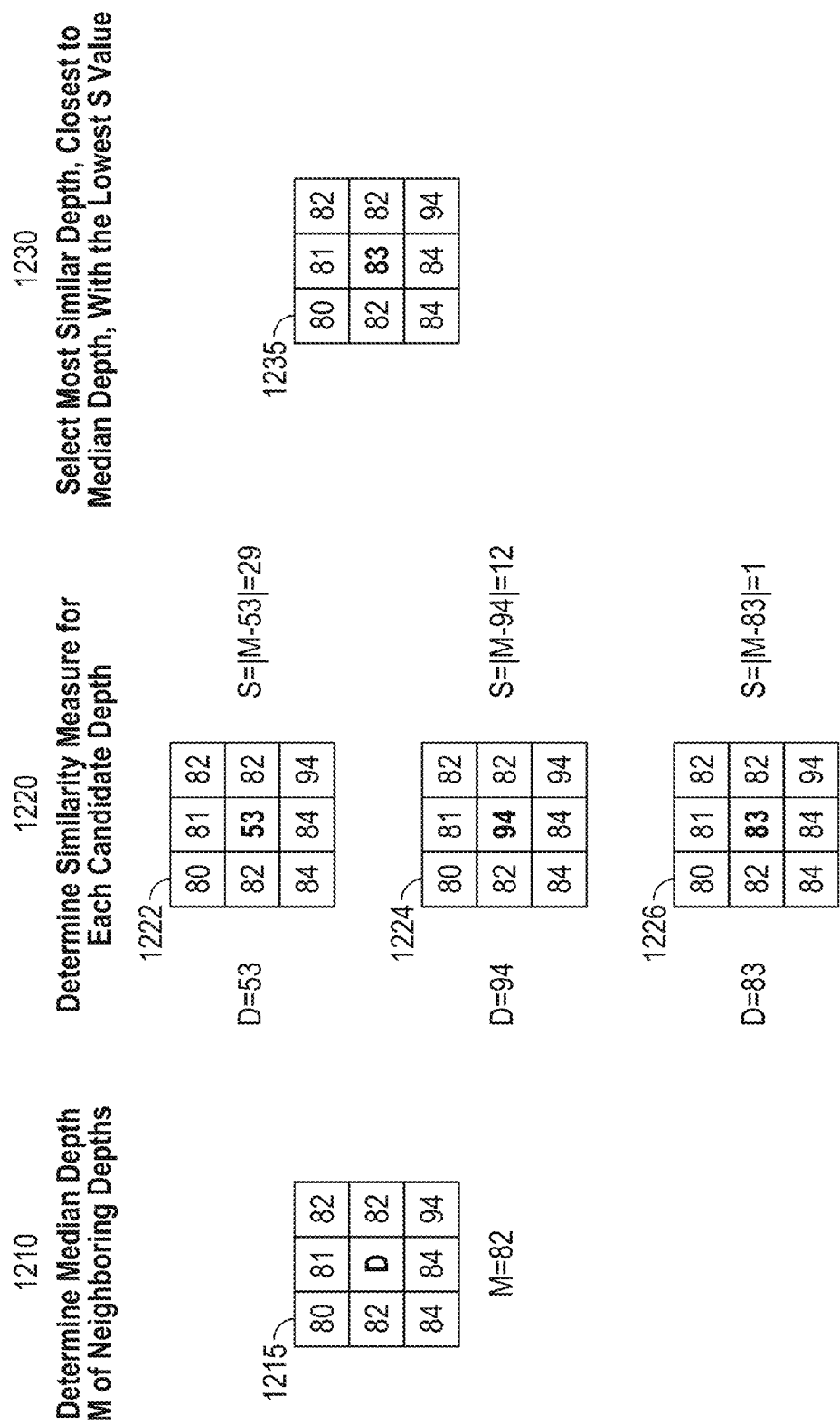
FIG. 12 illustrates an example of a process of error correction in a depth map.

FIG. 12 shows a portion of a process of error correction in a depth map, given a set of candidate replacement codewords, for example, 1110*a-c* illustrated in FIG. 11, which correspond to candidate depths D=53, D=94, and D=83, respectively. FIG. 12 shows a 3×3 region 1215 with an unknown depth value D at the center box of the region 125, with known depth values at neighboring locations with depth values 80, 81, 82, 82, 84, 84, 94, and 82, respectively. The depth is unknown at the center location of region 1215 because the code received at this center location was not a valid code in the codebook being used. This may be determined, for example, by the error detection process 1150 described in reference to FIG. 11. In step 1210, determine median depth M of neighboring depths, the median depth value of the eight neighboring locations in the depth map is M=82. This median depth measure M is used by the determine similarity measure for each candidate depth in step 1220. In step 1220, each candidate depth D=53, D=94, and D=83 is considered as the replacement depth in regions 1222, 1224, and 1226, respectively. A similarity measure S is determined by taking the absolute value of the difference of the candidate depth with the median depth determined in step 1210. A lower value for S corresponds to a depth that is more similar to the median. In the example of FIG. 12, in step 1220, the values for S for D=53, D=94, and D=83 are 29, 12, and 1, respectively. In step 1230 the most similar depth, D=83, with the lowest S value of 1 is selected, resulting in depth map region 1235, with D=83.

In this example illustrated in FIG. 12, the three candidate depths D=53, D=94, and D=83 were generated by generate depth process 1180 of FIG. 11 for codewords determined to be valid by check validity process 1170. In the embodiment illustrated in FIG. 12, the candidate depth that is closest to a median depth value of the eight closest depth map locations, corresponding to a 3×3 neighborhood, is selected. In some embodiments, the candidate depth that is closest to an average depth value of the eight closest depth locations is selected. In an embodiment, each candidate depth may be compared to a median depth, or an average depth of fewer than eight closest depth map locations (for example, the closest four locations). In an embodiment, each candidate depth may be compared to a median depth, or an average depth, of more than eight neighboring locations (for example, the closest 12, 20, 25, 29, 37, 45, or 49 neighbors). In an embodiment, if all the similarity measures do not meet a threshold, all candidate depths may be rejected.

Figure 13:
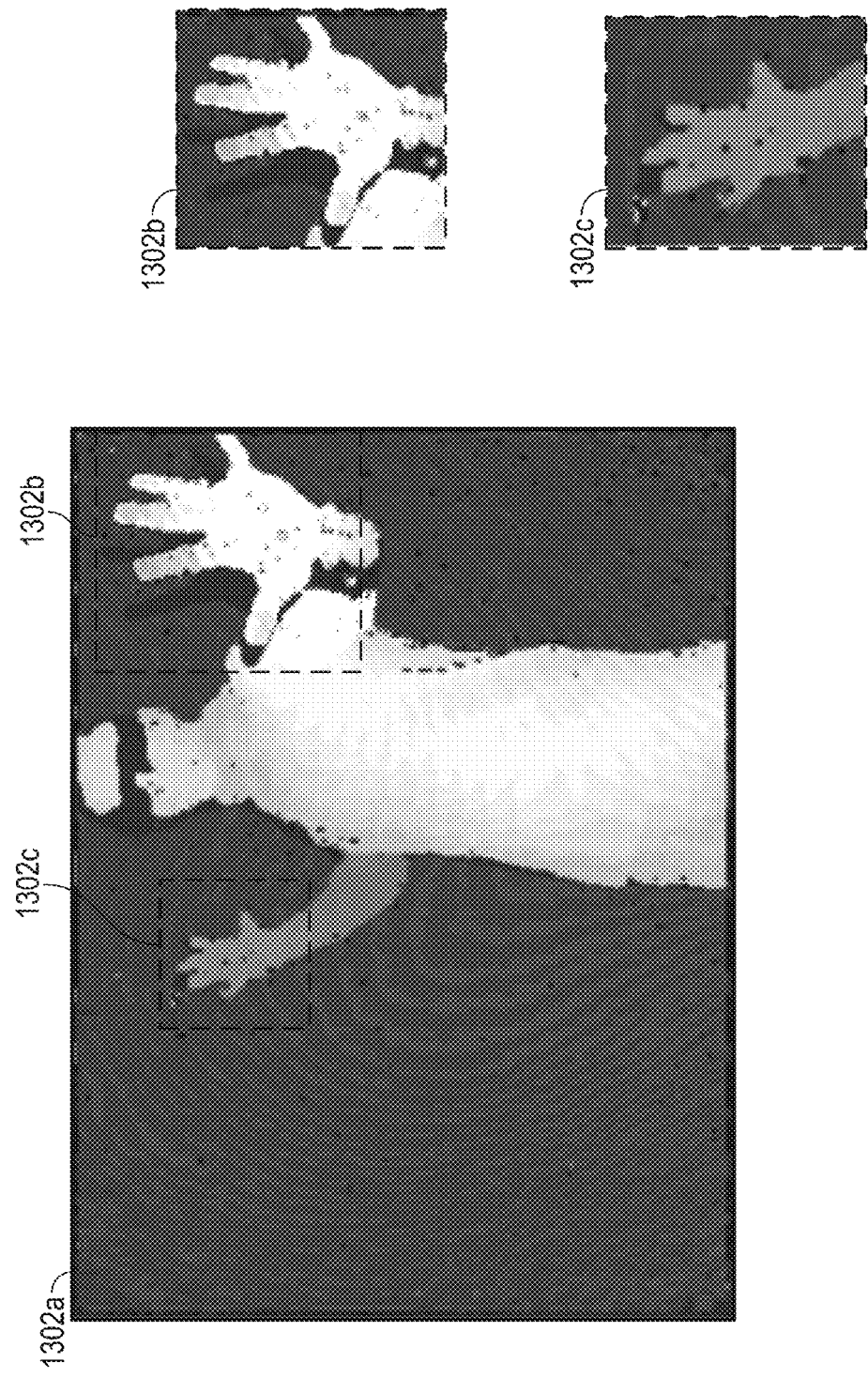
FIG. 13 depicts images illustrating some aspects of gap filling in a depth map using a median filter.

The approaches described herein correct errors by determining the most likely code that was transmitted. In contrast, existing approaches that do not correct errors may merely apply a median filter which defocuses or smooths depth maps. The results of this smoothing are illustrated in FIG. 13. The image 1302a includes the left hand 1302b and right hand 1302c. Both the left and right hands 1302b-c show a reduced number of gaps, but corresponding loss of detail.

Figure 14:
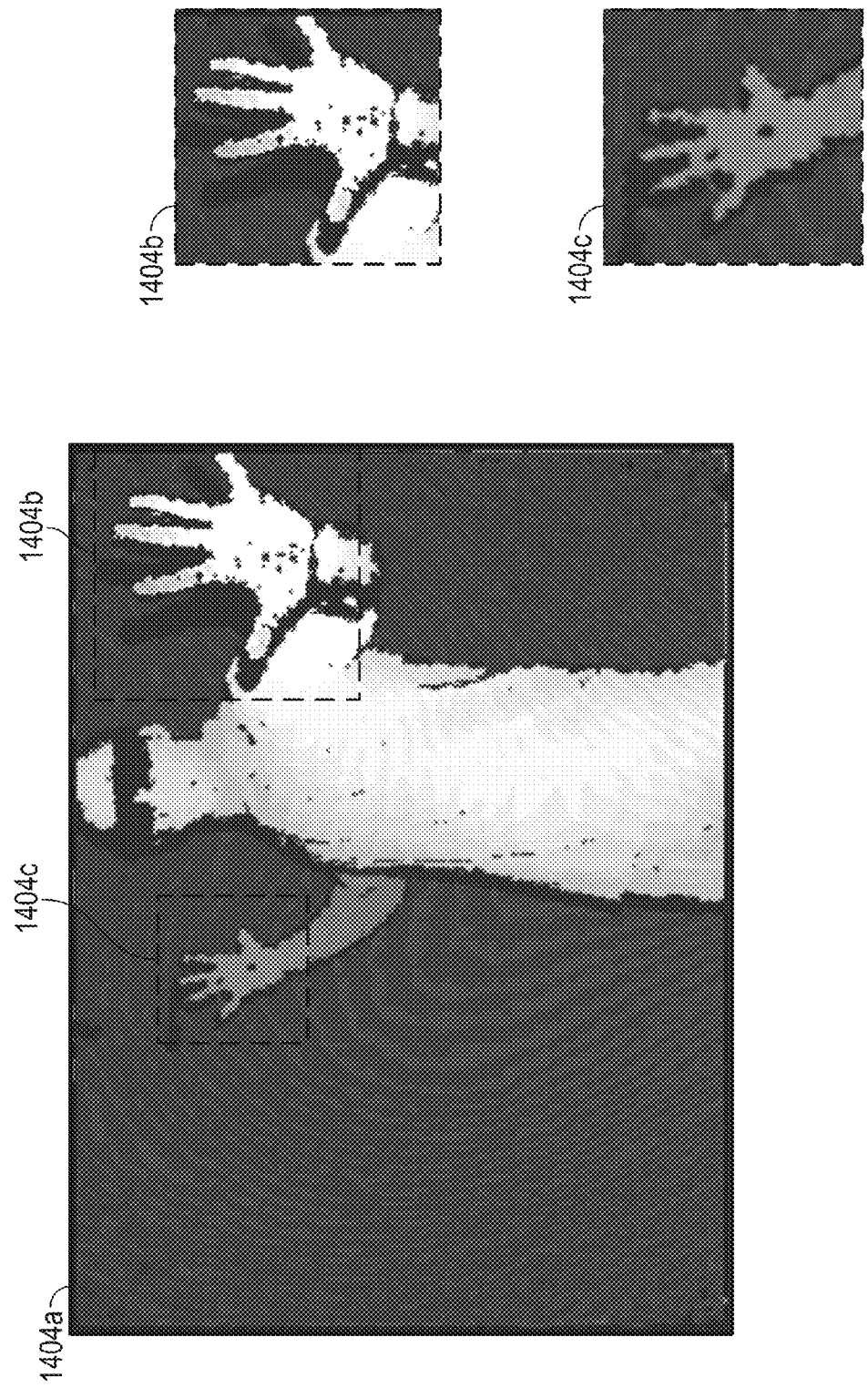
FIG. 14 depicts images illustrating some aspects of gap filling of a depth map using the methods and systems disclosed herein.

In contrast to the loss of detail shown by the median filter based solution of FIG. 13, FIG. 14 shows gap filling of a depth map using the methods and systems disclosed herein. As can be seen in the left and right hands 1404b-c of the image 1404a, while the gaps resulting from errors in the underlying coding have been reduced, detail is preserved relative to the left and right hands 1402b-c of the median filter shown in FIG. 13.

A method that uses Hamming distances as a measure between a received code and valid codes, may first consider valid codes at a Hamming distance of 1, corresponding to a single bit error. If there are no valid codes at a Hamming distance of 1, then the method may consider valid codes at a Hamming distance of 2, corresponding to two bit errors. If there are no valid codes at a Hamming distance of 2, then the method may consider valid codes at a Hamming distance of 3, up until reaching a threshold Hamming distance, which corresponds to a threshold number of bit errors.

In some embodiments, if there is a single valid code at a Hamming distance of 1, which corresponds to a single code in the codebook that differs from the received code by one bit, then that code may be assumed to be the transmitted code. If there are more than one valid codes at a Hamming distance of 1, then these valid codes may be considered candidate spatial codes.

In some embodiments, to determine which candidate spatial code was most likely transmitted, each of the candidate spatial codes may be compared to neighboring spatial codes, and a candidate selected as the most likely transmitted code based on the comparison. For example, if the basis functions of the neighboring spatial codes are more consistent with one of the candidates than all the others, than that candidate may be selected. In an embodiment, the depth corresponding to each of the candidate spatial codes may be compared to neighboring estimated depths, and a candidate selected based on the comparison. For example, a median filter value of the neighboring depths may be compared to the depth corresponding to each candidate code, and the candidate code with the closest depth to the median filter value may be selected.

The Hamming distance H between a pair of binary numbers corresponds to the number of bits that differ between the two numbers. For example, a Hamming distance of 2 corresponds to two bits being different between the received code and codes in the codebook. When a code is received, it can be first checked against the codebook for matches, where H=0. If there is a match (a code where H=0), then there is a match and in all likelihood, no bit errors. If there is not a match, the method considers all codes in the codebook where H=1, corresponding to single bit errors. If there is one code in the codebook where H=1, it is most likely that this code corresponds to the transmitted code, and depth may be estimated using this code. If there is more than one code in the codebook where H=1, then the codes for which H=1 are compared to determine which of the codes at H=1 is the most likely transmitted code.

Figure 15:
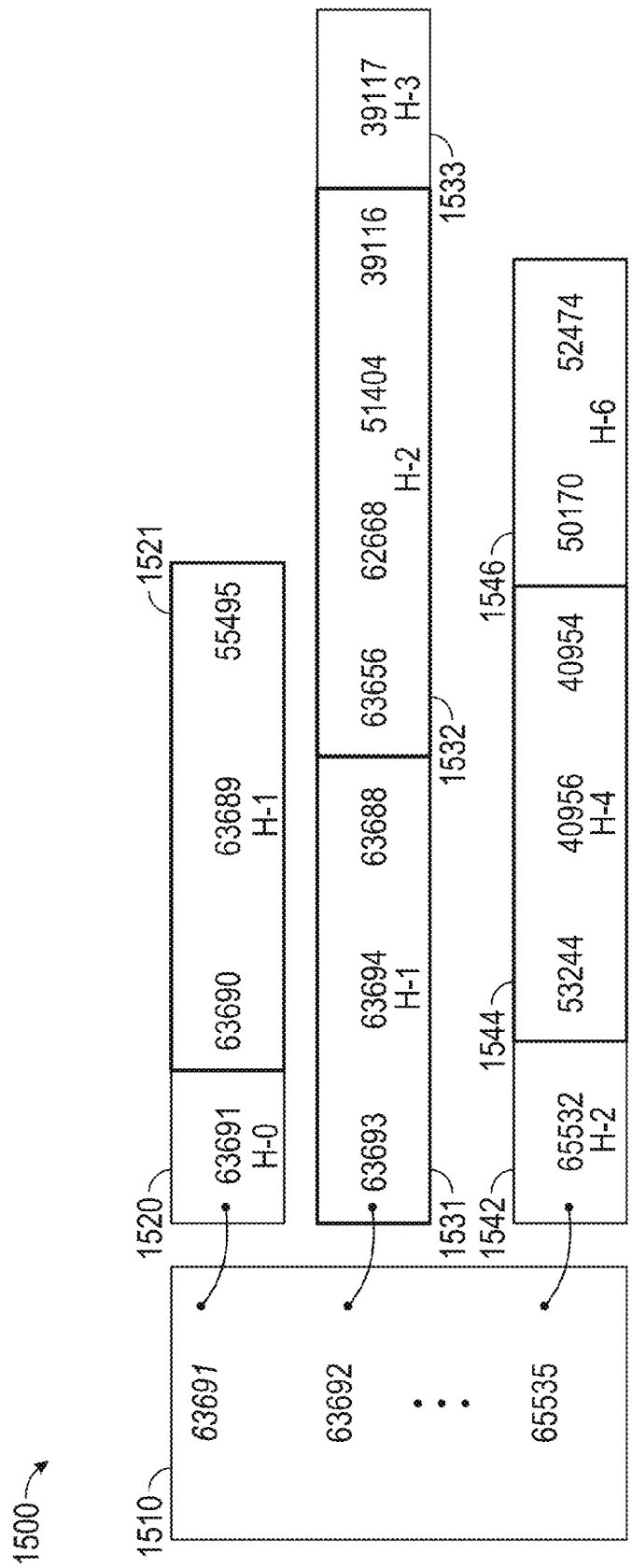
FIG. 15 illustrates an exemplary structure of organizing candidate codes in a codebook by Hamming distance for error correction.

FIG. 15 shows an exemplary structure of organizing candidate codes in a codebook by Hamming distance for error correction. List 1510 lists the possible received spatial codewords, including all possible binary combination of spatial codes. Both valid received codewords, for example, 63691, and invalid received codewords, for example, 63692 are in list 1510. Valid codewords are encoded in a structured light codemask and/or included in a codebook; invalid codewords are not, but may be received in the presence of noise. Each possible received spatial codeword in list 1510 points to, or refers to, one or more elements. For example, codeword 63691 points to elements 1520 and 1521. Codewords 63692 points to elements 1531, 1532, and 1533. Each element includes at least one valid codeword at a designated Hamming distance from the received spatial codeword which points to it. For example, elements 1520, 1533, and 1542 each include one valid codeword, element 1546 includes two valid codewords, and elements 1521, 1531, and 1544 each includes three valid codewords. Element 1532 includes four valid codewords. The codeword in element 1520 is at a Hamming distance of zero, identical to the received codeword 63691 as this is a valid codeword. Elements 1521 and 1531 each include codewords a Hamming distance of one from the received codeword that points to each of these elements, respectively. Elements 1532 and 1542 each includes codewords a Hamming distance of two (corresponding to two bit errors) from the received codeword that points to each of these elements respectively. Element 1546 includes two codewords a Hamming distance of 6 from received spatial codeword 65535, which points to or refers to element 1546. The two elements 1520 and 1521 that codeword 63691 may be combined to form a block, Similarly, the three elements 1531, 1532, and 1533 may be combined to form a block associated with codeword 63692 and elements 1542, 1544, and 1546 may combine to form a block associated with received codeword 65535.

Figure 16:
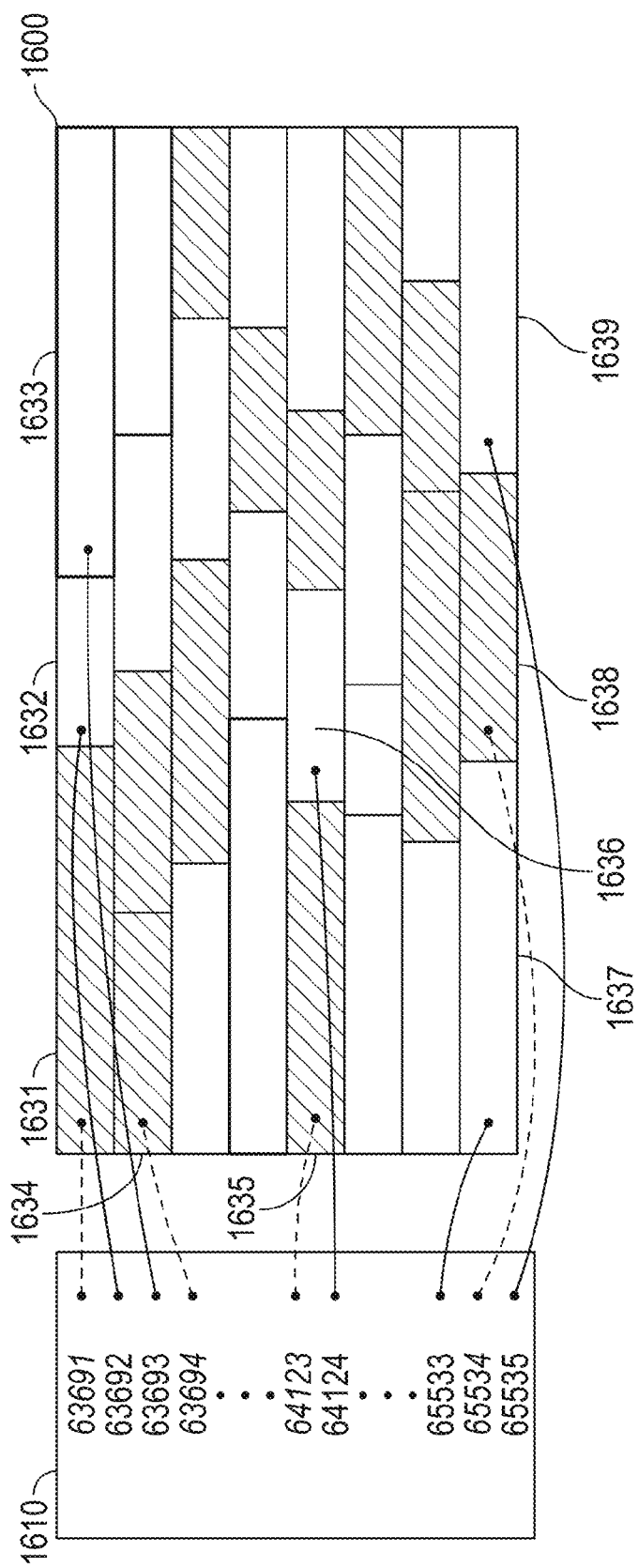
FIG. 16 illustrates an exemplary compact structure for organizing candidate codes in a codebook by Hamming distance for error correction.

Some embodiments may use a memory efficient coded light error correction approach, for example, the structure 1500 in FIG. 15 and/or the structure 1600 in FIG. 16, based on the observation that an implementation may have relatively few valid codes, out of the set of all possible codes. For example, an implementation with 4×4 spatial codes may have 405 valid codes out of a possible $2^{16}$ or 65,536 codes. To speed the time it takes to determine the most likely transmitted codeword, methods and systems may use a structure or look-up table (LUT), for example, structure 1500 to identify the set of valid codewords. For example, structure 1500 includes a list 1510 for each of the 65,536 possible received codes. Each of the spatial codes may be represented in binary, so that, for example, a 4×4 spatial code may correspond to a 4×4 array of binary digits, which may be represented as a binary number from 0 to 65535.

In this example the list 1510 (series of entries) includes 65,546 entries, of which three (63691, 63692, and 65535) are listed. The spatial code corresponding to 63691 is a valid code. Therefore, element 1520 lists the valid code with a Hamming distance of 0. Element 63692 is not valid, but there are three valid codes 63693, 63694, and 63688 in 1521 that are a Hamming distance of 1 from 63691. Element 1532 lists four codes, 63656, 62668, 51404, and 39116 that are a Hamming distance of 2 away from 63692. Structure 1533 lists one code, 39117, that is a Hamming distance of 3 away from 63692. In a similar manner, element 1542 lists one code 65532 that is a Hamming distance of two from 65535. Element 1544 lists three codes 53244, 40956, and 40954 that are a Hamming distance of four away from 65535. Element 1546 lists two codes, 50171 and 52474 that are a Hamming distance of 6 away from 65535. Accordingly, for each series of entries, the look-up table includes an H=0 entry, for example, 1520 for those received codes within the codebook, an H=1 entry, for example, 1521 and 1531 for those received codes for which there is one or more code in the codebook with a Hamming distance of 1, an H=2 entry, for example, 1532, 1542 for those received codes for which there is one or more code in the codebook with a Hamming distance of 2.

In some implementations, the structure 1500 contains matching codes at Hamming distances up to the number of bits in the spatial code. For some implementations, there may be an upper limit for Hamming distances, as the likelihood of more bit errors than that upper limit may be viewed as too unlikely for a match to be useful (for example, the probability of more than 6 bit errors is less than 0.000000001), then there may be no reason to include H=7 in the look-up table. For some implementations, the look-up table may only be populated with the lowest Hamming distance for which there are matches. For example, if a received code is H=1 away from three codes in the codebook, H=2 away from four codes in the codebook, and H=3 away from one code in the codebook, then the look-up table for this received code may only include the three codes at H=1. Similarly, if a received code has an exact match, then the Hamming look-up table may only include the H=0 entry. For example received code 63692 no H=0 codes, three H=1 codes, four H=2 codes, and one H=3 codes. If the four by four spatial code corresponding to 63692 is received, then the most likely codes in the codebook are 63693, 63694, and 63688 (each single bit error codes).

If there are no codes with H=0 or 1, then the method considers codes with H=2. If there is one code in the codebook where H=2, it is most likely that this code corresponds to the transmitted code, and depth may be estimated using this code. If there is more than one code in the codebook where H=2, then the codes for which H=1 are compared to determine which of the codes at H=2 is the most likely transmitted code. This process may repeat for H=3, 4, 5, and possibly more H values.

FIG. 16 shows an example of a structure for organizing candidate codes in a codebook by Hamming distance for error correction. A list 1610 of received codewords, corresponding to the list 1510 of codewords in FIG. 15, lists the set of possible received codewords in the presence of noise. List 1610 includes valid and invalid received codes. Each codeword in list 1610 points to (refers to, is indexed to) a block (for example, any of blocks 1631-1639) in structure 1600. Each block includes one or more elements corresponding to the elements 1520, 1521, 1531, 1532, 1533, 1542, 1544, and 1546 illustrated in FIG. 15. Each element includes at least one valid codeword at a designated Hamming distance from the received spatial codeword which points to it. These definitions correspond to the definitions of blocks and elements as described above for FIG. 15. The structure 1600 may be implemented in a memory unit as a look-up table, indexed array, linked list, relational database, or other structure that enables retrieval of valid codewords, elements, and/or blocks associated with a received codeword.

In an implementation, this structure may contain the same information that is contained in the structure 1500 of FIG. 15. However, the structure 1600 may be more compact for implementation in a memory unit. List 1610 lists the possible received codes, of which some are valid, and some are not. For example, list 1610 lists codes 63691-63694, 64123, 64124, and 65533-65535. As noted with regard to list 1510, an implementation may list all possible received spatial codes, but a small subset is included in FIG. 16 for clarity. Codes 63691, 63694, 64123, and 65534 listed in list 1610 are valid codes for transmission, but codes 63692, 63693, 64124, 65533, and 65535 are not valid codes that were received in error. As illustrated in FIG. 15, the valid codes in the codebook for H=0, H=1, H=2, etc. are determined for each code. For example, elements 1531, 1532, and 1533 of FIG. 15 for received code 63692 may be combined into a single block 1632. In a similar manner, blocks 1631, 1633, 1634, 1635, 1636, 1637, 1638, and 1639 each combined elements by Hamming distance for spatial codes 63691, 63693, 63694, 64123, 64124, 65533, 65534, and 65535, respectively.

Figure 17:
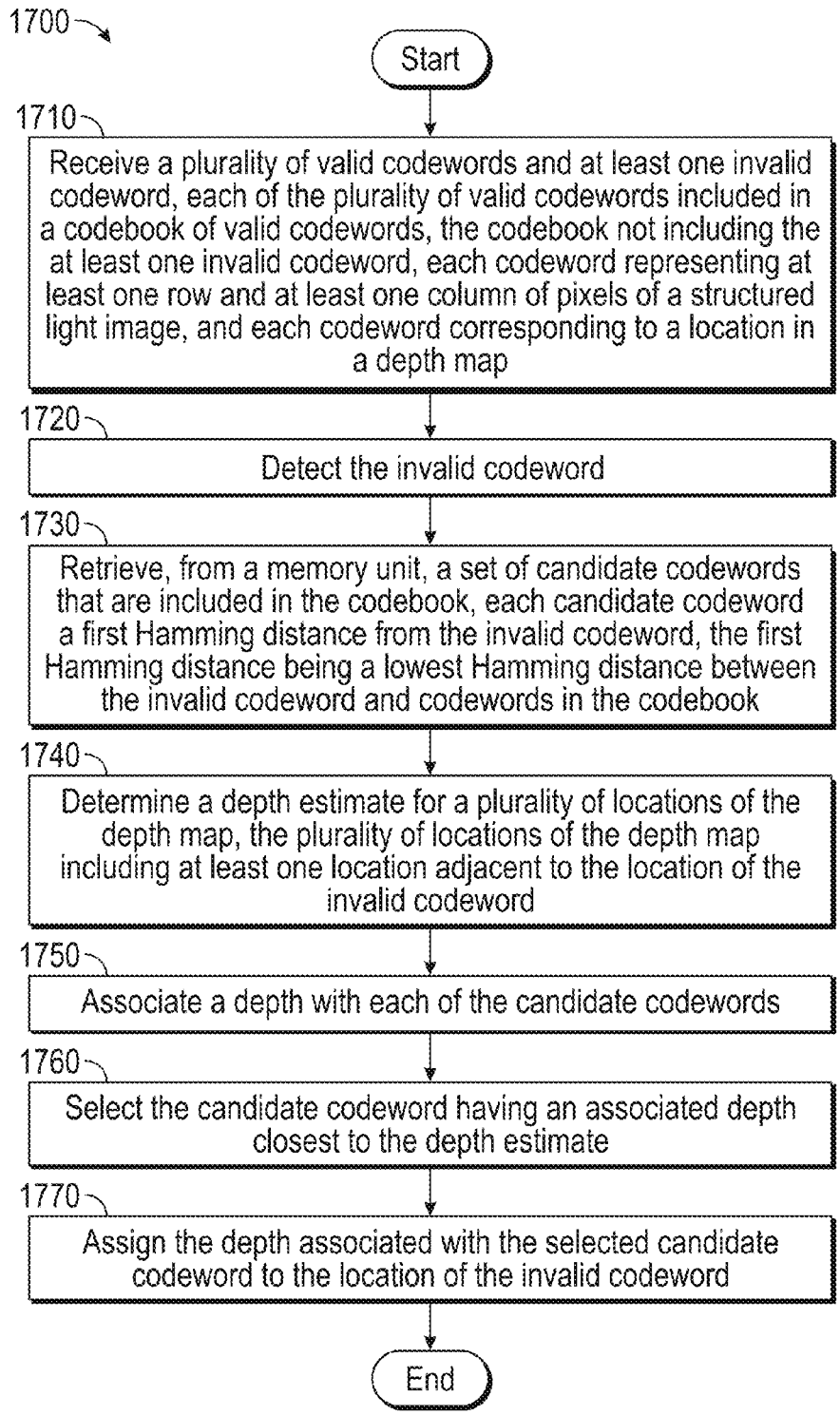
FIG. 17 is a flowchart that illustrates an example of a process of correcting errors in codewords generated from structured light.

This compact structure of FIG. 16 makes it possible to detect errors, and then determine candidate codes for correction by the method described in FIG. 17, without adding extra bits, for example, parity bits, or using redundancy to enable error correction. The disclosed error correction system is inherently different from traditional methods which employ redundancy. Adding redundant material to the codeword has the disadvantage of increasing the size of the codeword, which in turn reduces the minimum detectable object size. The increase in code size also reduces the number of codes in the pattern which reduces the resolution of the depth map. In order to circumvent these drawbacks in redundancy coding the disclosed technology may instead endow the codes with structure devised from selecting codewords as a linear combination of spatial basis functions. Thus the error correction capability is inherently coupled to the codeword structure. These basis functions allow error detection and correction without resorting to redundancy.

FIG. 17 is a flowchart of a method of correcting errors in codewords generated from structured light. In some aspects, the method 1700 may be performed by the device 600, discussed above with respect to FIG. 6. For example, processor instructions stored in a memory 608 may configure the processor 606 to perform one or more of the functions discussed below with respect to method 1700.

In block 1710, method 1700 receives a plurality of valid codewords and at least one invalid codeword. Each of the plurality of valid codewords is included in a codebook of valid codewords, the codebook not including the at least one invalid codeword. Each codeword represents at least one row and at least one column of pixels of a structured light image, and each codeword corresponds to a location in a depth map. Each pixel may represent received light energy.

Each pixel may have a binary value. In some implementations, the functionality of block 1710 may be performed by the receiver sensor 508 illustrated in FIG. 5.

In block 1720, method 1700 detects the invalid codeword. Method 1700 may detect the invalid codeword by retrieving from the memory unit an indication that the invalid codeword is not included in the codebook. Method 1700 may populate the memory unit with an indication of whether each received valid or invalid codeword is included in the codebook. In some implementations, the functionality of block 1720 may be performed by processor 606 and memory 608 illustrated in FIG. 6, In some implementations, the functionality of block 1720 may be performed by processing circuit 504 and memory/storage device 506 illustrated in FIG. 5.

In block 1730, method 1700 retrieves, from a memory unit, a set of candidate codewords that are included in the codebook. Each candidate codeword is a first Hamming distance from the invalid codeword, the first Hamming distance being a lowest Hamming distance between the invalid codeword and codewords in the codebook. The first Hamming distance between the invalid codeword and each of the candidate codewords may be the number of the at least one row and the at least one column of pixels with different binary values. Method 1700 may populate the memory unit with the set of candidate codewords the first Hamming distance from the invalid codeword, the first Hamming distance being the lowest Hamming distance between the invalid codeword and codewords in the codebook. Method 1700 may populate the memory unit with a second set of candidate codewords, the second set of candidate codewords corresponding to codewords that are included in the codebook, each of the corresponding second set of candidate codewords a second Hamming distance from the invalid codeword, the second Hamming distance higher than the first Hamming distance. In some implementations, the functionality of block 1730 may be performed by processor 606 and memory 608 illustrated in FIG. 6. In some implementations, the functionality of block 1720 may be performed by processing circuit 504 and memory/storage device 506 illustrated in FIG. 5.

In block 1740, method 1700 determines a depth estimate for a plurality of locations of the depth map, the plurality of locations of the depth map including at least one location adjacent to the location of the invalid codeword. Method 1700 may determine the depth estimate by computing a median depth or an average depth of the plurality of locations of the depth map. The plurality of locations of the depth map may include locations less than or equal to a threshold distance in locations from the location of the invalid codeword. The threshold distance may be 1, $\sqrt{2}$, 2, $\sqrt{5}$, 2, or $2\sqrt{2}$, corresponding to 4, 8, 12, 20, and 24 locations in the plurality of locations of the depth map, respectively. In some implementations, the functionality of block 1720 may be performed by processor 606 and memory 608 illustrated in FIG. 6, In some implementations, the functionality of block 1740 may be performed by processing circuit 504 and memory/storage device 506 illustrated in FIG. 5.

In block 1750, method 1700 associates a depth with each of the candidate codewords. In some implementations, the functionality of block 1720 may be performed by processor 606 and memory 608 illustrated in FIG. 6, In some implementations, the functionality of block 1750 may be performed by processing circuit 504 and memory/storage device 506 illustrated in FIG. 5.

In block 1760, method 1700 selects the candidate codeword having an associated depth closest to the depth estimate. In some implementations, the functionality of block 1720 may be performed by processor 606 and memory 608 illustrated in FIG. 6, In some implementations, the functionality of block 1760 may be performed by processing circuit 504 and memory/storage device 506 illustrated in FIG. 5.

In block 1770, method 1700 assigns the depth associated with the selected candidate codeword to the location of the invalid codeword. In some implementations, the functionality of block 1770 may be performed by processor 606 and memory 608 illustrated in FIG. 6, In some implementations, the functionality of block 1770 may be performed by processing circuit 504 and memory/storage device 506 illustrated in FIG. 5.

It should be understood that any reference to an element herein using a designation, for example, "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table for example a look-up table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, for example, various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies, for example, as infrared, radio, and microwave, then the coaxial cable, fiber optic cable, twisted pair, DSL, or wireless technologies, e.g., infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium, for example, a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for correcting errors in a depth map generated by a structured light system, the method comprising:
   receiving a plurality of valid codewords and at least one invalid codeword, each of the plurality of valid codewords included in a codebook of valid codewords, the codebook not including the at least one invalid codeword, each codeword representing at least one row and at least one column of pixels of a structured light image, and each codeword corresponding to a location in a depth map;
   detecting the invalid codeword;
   retrieving, from a memory unit, a set of candidate codewords that are included in the codebook, each candidate codeword a first Hamming distance from the invalid codeword, the first Hamming distance being a lowest Hamming distance between the at least one invalid codeword and the codewords in the codebook;
   determining a depth estimate for a plurality of locations of the depth map that include at least one location adjacent to the invalid codeword location in the depth map;
   associating a depth with each of the candidate codewords;
   selecting the candidate codeword having an associated depth closest to the determined depth estimate; and
   assigning the depth associated with the selected candidate codeword to the location of the invalid codeword.

2. The method of claim 1, wherein each pixel in the at least one column of pixels represents received light energy, and wherein each pixel n in the at least one column of pixels has a binary value.

3. The method of claim 1, wherein detecting the at least one invalid codeword comprises retrieving from the memory unit an indication that the invalid codeword is not included in the codebook.

4. The method of claim 1, further comprising populating the memory unit with an indication of whether each received plurality of codewords and the at least one invalid codeword is included in the codebook.

5. The method of claim 1, wherein the first Hamming distance between the at least one invalid codeword and each of the candidate codewords is the number of the at least one row and the at least one column of pixels with different binary values.

6. The method of claim 1, further comprising populating the memory unit with the set of candidate codewords at the first Hamming distance from the invalid codeword, the first Hamming distance being the lowest Hamming distance between the invalid codeword and codewords in the codebook.

7. The method of claim 6, further comprising populating the memory unit with a second set of candidate codewords, the second set of candidate codewords corresponding to codewords that are included in the codebook, each of the corresponding second set of candidate codewords a second Hamming distance from the invalid codeword, the second Hamming distance higher than the first Hamming distance.

8. The method of claim 1, wherein determining the depth estimate comprises computing a median depth or an average depth of the plurality of locations of the depth map.

9. The method of claim 1, wherein the plurality of locations of the depth map includes locations less than or equal to a threshold distance in locations from the location of the invalid codeword.

10. The method of claim 9, wherein the threshold distance is 1, $\sqrt{2}$, 2, $\sqrt{5}$, 2, or $2\sqrt{2}$, corresponding to 4, 8, 12, 20, and 24 locations in the plurality of locations of the depth map, respectively.

11. An apparatus for correcting errors in a depth map generated by a structured light system, the apparatus comprising:
   a memory unit configured to:
     store a plurality of valid codewords and at least one invalid codeword, each of the plurality of valid codewords included in a codebook of valid codewords, the codebook not including the at least one invalid codeword, each codeword representing at least one row and at least one column of pixels of a structured light image, and each codeword corresponding to a location in a depth map, the memory unit further configured to store a set of candidate codewords that are included in the codebook, each candidate codeword a first Hamming distance from the invalid codeword, the first Hamming distance being a lowest Hamming distance between the invalid codeword and codewords in the codebook; and a processor in communication with the memory unit, the processor configured to:
receive the plurality of valid codewords and the at least one invalid codeword,
detect the invalid codeword,
retrieve the set of candidate codewords,
determine a depth estimate for a plurality of locations of the depth map, the plurality of locations of the depth map including at least one location adjacent to the location of the invalid codeword,
associate a depth with each of the candidate codewords,
select the candidate codeword having an associated depth closest to the depth estimate, and
assign the depth associated with the selected candidate codeword to the location of the invalid codeword.

12. The apparatus of claim 11, wherein each pixel represents received light energy, and wherein each pixel has a binary value.

13. The apparatus of claim 11, wherein the processor detects the invalid codeword by retrieving, from the memory unit, an indication that the invalid codeword is not included in the codebook.

14. The apparatus of claim 11, the processor further configured to populate the memory unit with an indication of whether each received valid or invalid codeword is included in the codebook.

15. The apparatus of claim 11, wherein the first Hamming distance between the invalid codeword and each of the candidate codewords is the number of the at least one row and the at least one column of pixels with different binary values.

16. The apparatus of claim 11, the processor further configured to populate the memory unit with the set of candidate codewords at the first Hamming distance from the invalid codeword, the first Hamming distance being the lowest Hamming distance between the invalid codeword and codewords in the codebook.

17. The apparatus of claim 16, the processor further configured to populate the memory unit with a second set of candidate codewords, the second set of candidate codewords corresponding to codewords that are included in the codebook, each of the corresponding second set of candidate codewords a second Hamming distance from the invalid codeword, the second Hamming distance higher than the first Hamming distance.

18. The apparatus of claim 11, wherein the processor is configured to estimate the depth estimate by computing a median depth or an average depth of the plurality of locations of the depth map.

19. The apparatus of claim 11, wherein the plurality of locations of the depth map includes locations less than or equal to a threshold distance in locations from the location of the invalid codeword.

20. The apparatus of claim 19, wherein the threshold distance is 1, $\sqrt{2}$, 2, $\sqrt{5}$, 2, or $2\sqrt{2}$, corresponding to 4, 8, 12, 20, and 24 locations in the plurality of locations of the depth map, respectively.

21. An apparatus for correcting errors in a depth map generated by a structured light system, the apparatus comprising:
means for storing a plurality of valid codewords and at least one invalid codeword, each of the plurality of valid codewords included in a codebook of valid codewords, the codebook not including the at least one invalid codeword, each codeword representing at least one row and at least one column of pixels of a structured light image, and each codeword corresponding to a location in a depth map;
means for receiving a plurality of valid codewords and at least one invalid codeword,
means for detecting the invalid codeword;
means for retrieving, from the means for storing, a set of candidate codewords that are included in the codebook, each candidate codeword a first Hamming distance from the invalid codeword, the first Hamming distance being a lowest Hamming distance between the at least one invalid codeword and the codewords in the codebook;
means for determining a depth estimate for a plurality of locations of the depth map that include at least one location adjacent to the invalid codeword location in the depth map;
means for associating a depth with each of the candidate codewords;
means for selecting the candidate codeword having an associated depth closest to the determined depth estimate; and
means for assigning the depth associated with the selected candidate codeword to the location of the invalid codeword.

22. The apparatus of claim 21, wherein the means comprises a memory unit, wherein the means for receiving comprises a receiver having a processor.

23. The apparatus of claim 21, wherein each pixel represents received light energy, wherein each pixel is represented by a binary value.

24. The apparatus of claim 21, wherein the means for detecting detects the invalid codeword by retrieving, from the storing means, an indication that the invalid codeword is not included in the codebook.

25. The apparatus of claim 21, further comprising means for populating the means for storing with an indication of whether each received codeword is included in the codebook.

26. The apparatus of claim 21, further comprising means for populating the storing means with the set of candidate codewords at the first Hamming distance from the invalid codeword.

27. The apparatus of claim 26, further comprising means for populating the storing means with a second set of candidate codewords, the second set of candidate codewords corresponding to codewords that are included in the codebook, each of the corresponding second set of candidate codewords a second Hamming distance from the invalid codeword, the second Hamming distance higher than the first Hamming distance.

28. The apparatus of claim 21, wherein the means for determining is configured to estimate the depth estimate by computing a median depth or an average depth of the plurality of locations of the depth map.

29. The apparatus of claim 21, wherein the plurality of locations of the depth map includes locations less than or equal to a threshold distance in locations from the location of the invalid codewords, wherein the threshold distance is 1, $\sqrt{2}$, 2, $\sqrt{5}$, 2, or $2\sqrt{2}$, corresponding to 4, 8, 12, 20, and 24 locations in the plurality of locations of the depth map, respectively.

30. A non-transitory computer-readable medium storing instructions for correcting errors in a depth map generated by a structured light system, the instructions when executed that, when executed, perform a method comprising:

receiving a plurality of valid codewords and at least one invalid codeword, each of the plurality of valid codewords included in a codebook of valid codewords, the codebook not including the at least one invalid codeword, and each codeword corresponding to a location in a depth map;

detecting the invalid codeword;

retrieving, from a memory unit, a set of candidate codewords that are included in the codebook, each candidate codeword a first Hamming distance from the invalid codeword, the first Hamming distance being a lowest Hamming distance between the invalid codeword and codewords in the codebook;

determining a depth estimate for a plurality of locations of the depth map, the plurality of locations of the depth map including at least one location adjacent to the location of the invalid codeword;

associating a depth with each of the candidate codewords;

selecting the candidate codeword having an associated depth closest to the depth estimate; and assigning the depth associated with the selected candidate codeword to the location of the invalid codeword.

* * * * *